(12) United States Patent
Sung et al.

(10) Patent No.: US 8,832,294 B2
(45) Date of Patent: Sep. 9, 2014

(54) METHOD AND APPARATUS FOR MANAGING CONTENT SERVICE IN NETWORK BASED ON CONTENT USE HISTORY

(75) Inventors: Ju-yun Sung, Gyeonggi-do (KR);
Hee-jeong Choo, Gyeonggi-do (KR);
Keum-koo Lee, Gyeonggi-do (KR);
Ji-young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 12/913,272

(22) Filed: Oct. 27, 2010

(65) Prior Publication Data
US 2011/0106911 A1    May 5, 2011

(30) Foreign Application Priority Data

Oct. 30, 2009    (KR) .................. 10-2009-0104429

(51) Int. Cl.
*G06F 15/16*    (2006.01)
(52) U.S. Cl.
USPC ........................... 709/231; 709/203; 709/217
(58) Field of Classification Search
USPC .................. 709/231, 232, 223, 224, 203, 217
See application file for complete search history.

(56) References Cited

U.S. PATENT DOCUMENTS

| | | | |
|---|---|---|---|
| 7,294,776 B2 * | 11/2007 | Tohgi et al. ..................... 84/600 |
| 7,483,958 B1 * | 1/2009 | Elabbady et al. ............. 709/217 |
| 7,707,268 B2 * | 4/2010 | Saito et al. ..................... 709/217 |
| 7,992,171 B2 * | 8/2011 | Amidon et al. ................. 725/50 |
| 8,065,743 B2 * | 11/2011 | Numata ........................... 726/30 |
| 8,145,571 B2 * | 3/2012 | Jothipragasam et al. ....... 705/59 |
| 8,230,084 B2 * | 7/2012 | Singer et al. .................. 709/229 |
| 8,527,424 B2 * | 9/2013 | Yamashima et al. ............ 705/57 |
| 8,621,055 B2 * | 12/2013 | Lee et al. ....................... 709/223 |
| 2002/0077988 A1 * | 6/2002 | Sasaki et al. .................... 705/59 |
| 2002/0107806 A1 * | 8/2002 | Higashi et al. .................. 705/51 |
| 2004/0143661 A1 * | 7/2004 | Higashi et al. ................ 709/224 |
| 2006/0036610 A1 | 2/2006 | Wang |
| 2006/0282394 A1 * | 12/2006 | Jothipragasam et al. ....... 705/59 |
| 2007/0136488 A1 | 6/2007 | Cho et al. |
| 2007/0192697 A1 * | 8/2007 | Kawamura et al. ........... 715/716 |

(Continued)

FOREIGN PATENT DOCUMENTS

EP    1 862 917    12/2007
JP    2007-174642    7/2007

(Continued)

OTHER PUBLICATIONS

PCT/ISA/237 Written Opinion issued on PCT/KR2010/007347 (5pp.).

(Continued)

*Primary Examiner* — LaShonda Jacobs
(74) *Attorney, Agent, or Firm* — The Farrell Law Firm, P.C.

(57) ABSTRACT

A content service managing method is provided which includes receiving a use request for content from a first device from among a plurality of devices that are capable of performing data communication and belong to a network; collecting and managing a variety of related information including content attribute information, device attribute information, user attribute information, and content use history information; and determining a method of obtaining the content, based on the variety of related information, and controlling the content to be provided to a second device which is to use the content from among the devices of the network.

33 Claims, 22 Drawing Sheets

(56) References Cited

U.S. PATENT DOCUMENTS

| | | | |
|---|---|---|---|
| 2007/0206920 A1* | 9/2007 | Hirose et al. | 386/95 |
| 2007/0274165 A1* | 11/2007 | Tanaka et al. | 369/30.25 |
| 2008/0046397 A1* | 2/2008 | Shirai et al. | 707/1 |
| 2008/0059992 A1* | 3/2008 | Amidon et al. | 725/25 |
| 2008/0077703 A1* | 3/2008 | Lee | 709/232 |
| 2008/0214153 A1 | 9/2008 | Ramer et al. | |
| 2009/0016537 A1* | 1/2009 | Ju et al. | 380/278 |
| 2009/0100135 A1 | 4/2009 | Lee et al. | |
| 2009/0265475 A1* | 10/2009 | Fujita | 709/231 |
| 2009/0282001 A1* | 11/2009 | Fukuda | 707/3 |
| 2010/0088292 A1* | 4/2010 | Tirpak et al. | 707/705 |
| 2013/0219284 A1* | 8/2013 | Kim | 715/739 |
| 2013/0267172 A1* | 10/2013 | Ko et al. | 455/41.1 |
| 2014/0059644 A1* | 2/2014 | Shin et al. | 726/2 |

FOREIGN PATENT DOCUMENTS

| | | |
|---|---|---|
| KR | 1020090000175 | 1/2009 |
| KR | 1020090038224 | 4/2009 |
| KR | 1020090058402 | 6/2009 |
| KR | 1020090074888 | 7/2009 |
| RU | 2323472 | 4/2008 |

OTHER PUBLICATIONS

Examination Report dated Apr. 8, 2013 issued in counterpart Australian Application No. 2010314061.

Mexican Office Action dated Aug. 14, 2013 issued in counterpart application No. MX/a/2012/005097.

Russian Office Action dated Sep. 17, 2013 issued in counterpart application No. 2012122192/08.

International Search Report dated Jun. 23, 2011 issued in counterpart application No. PCT/KR2010/007347.

Canadian Office Action dated Dec. 31, 2013 issued in counterpart application No. 2,779,428.

Indonesian Office Action dated Feb. 20, 2014 issued in counterpart application No. W-00201202109.

* cited by examiner

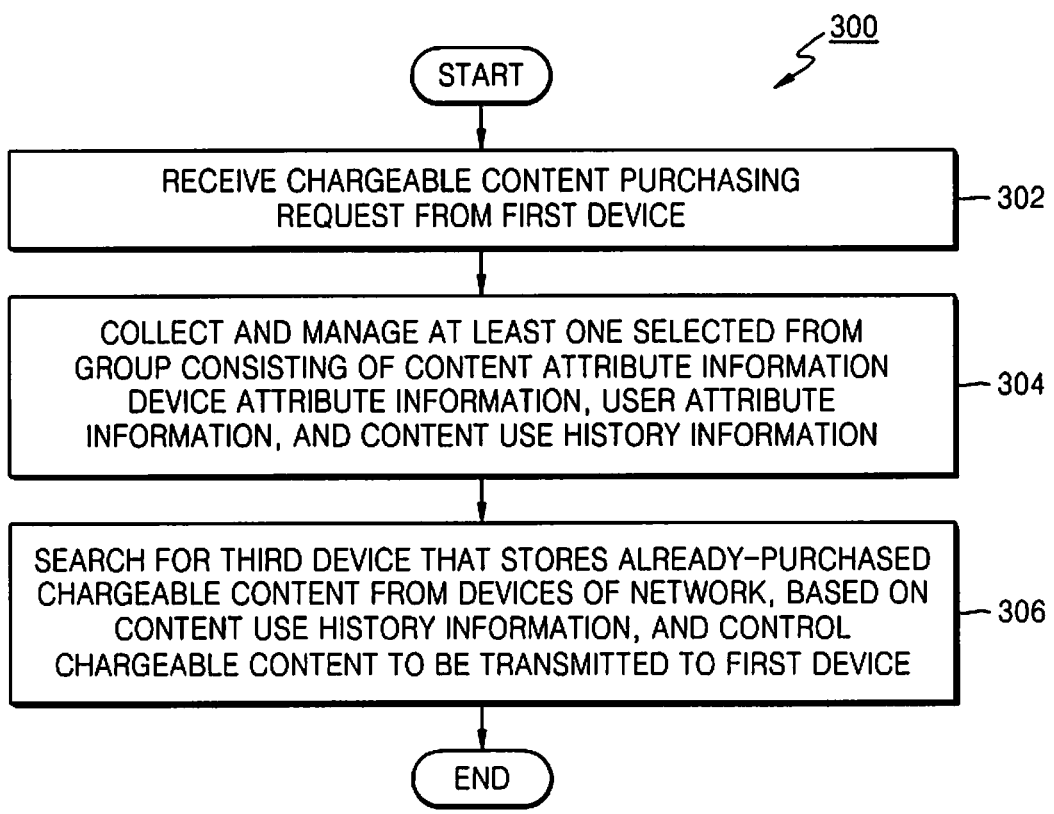

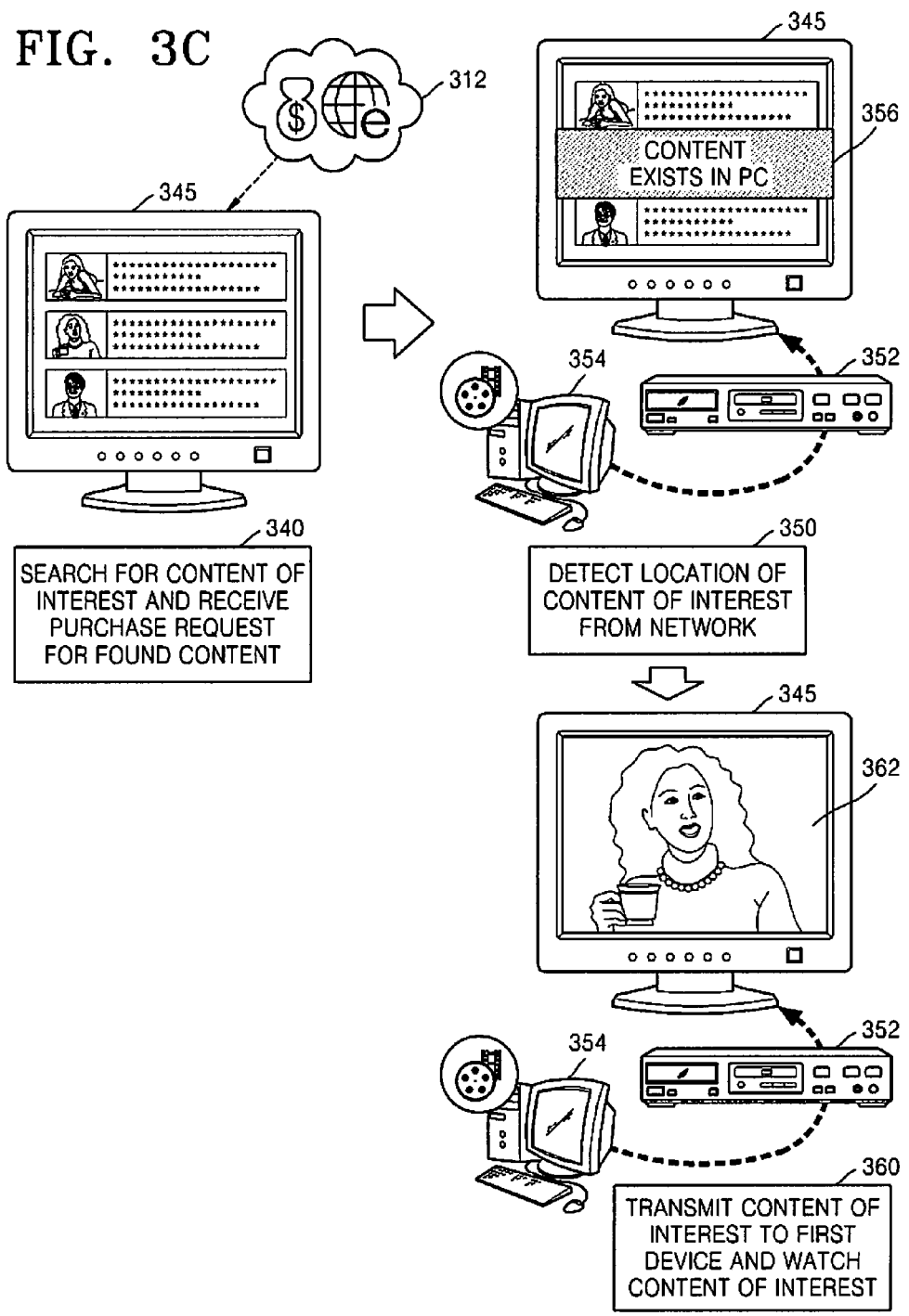

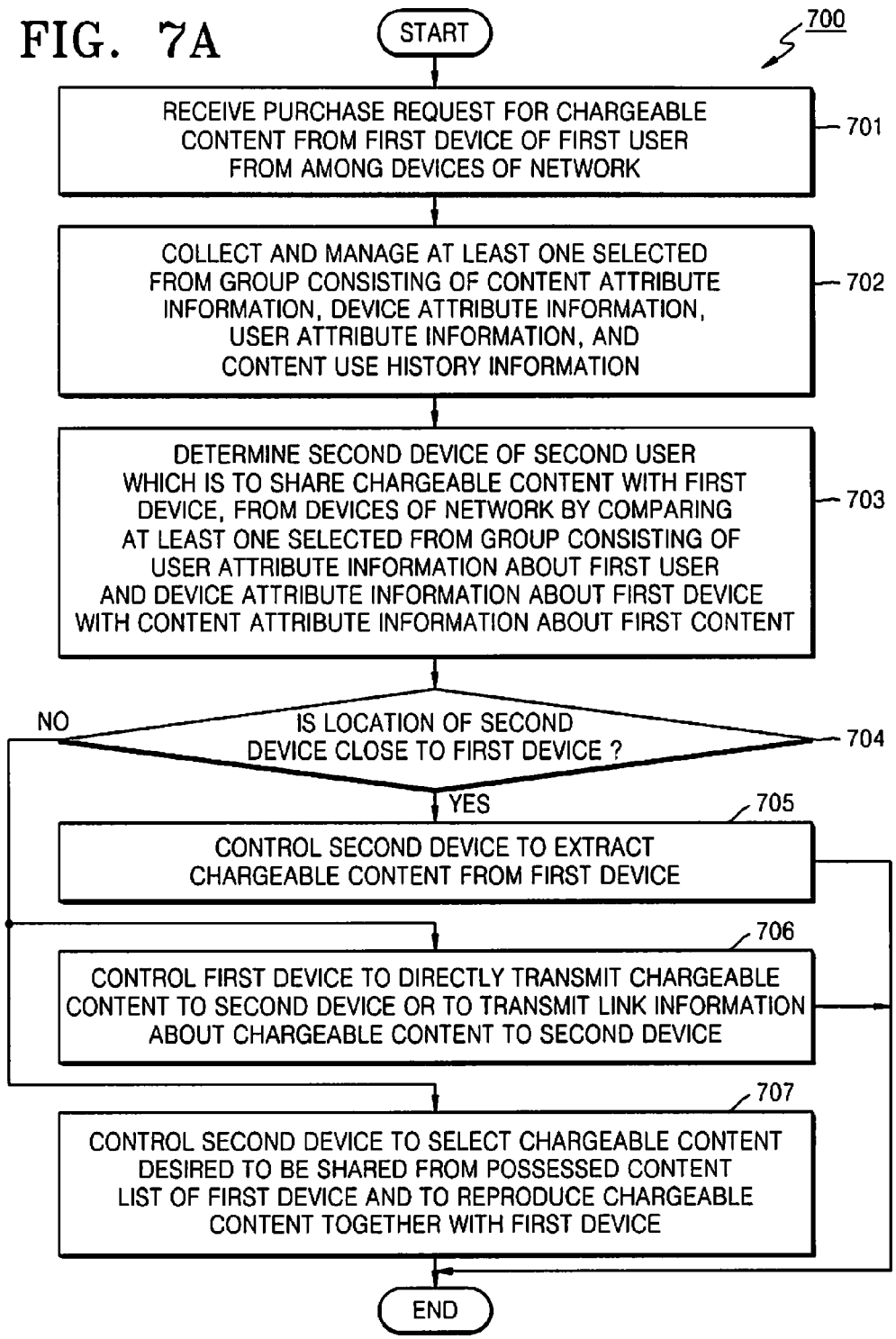

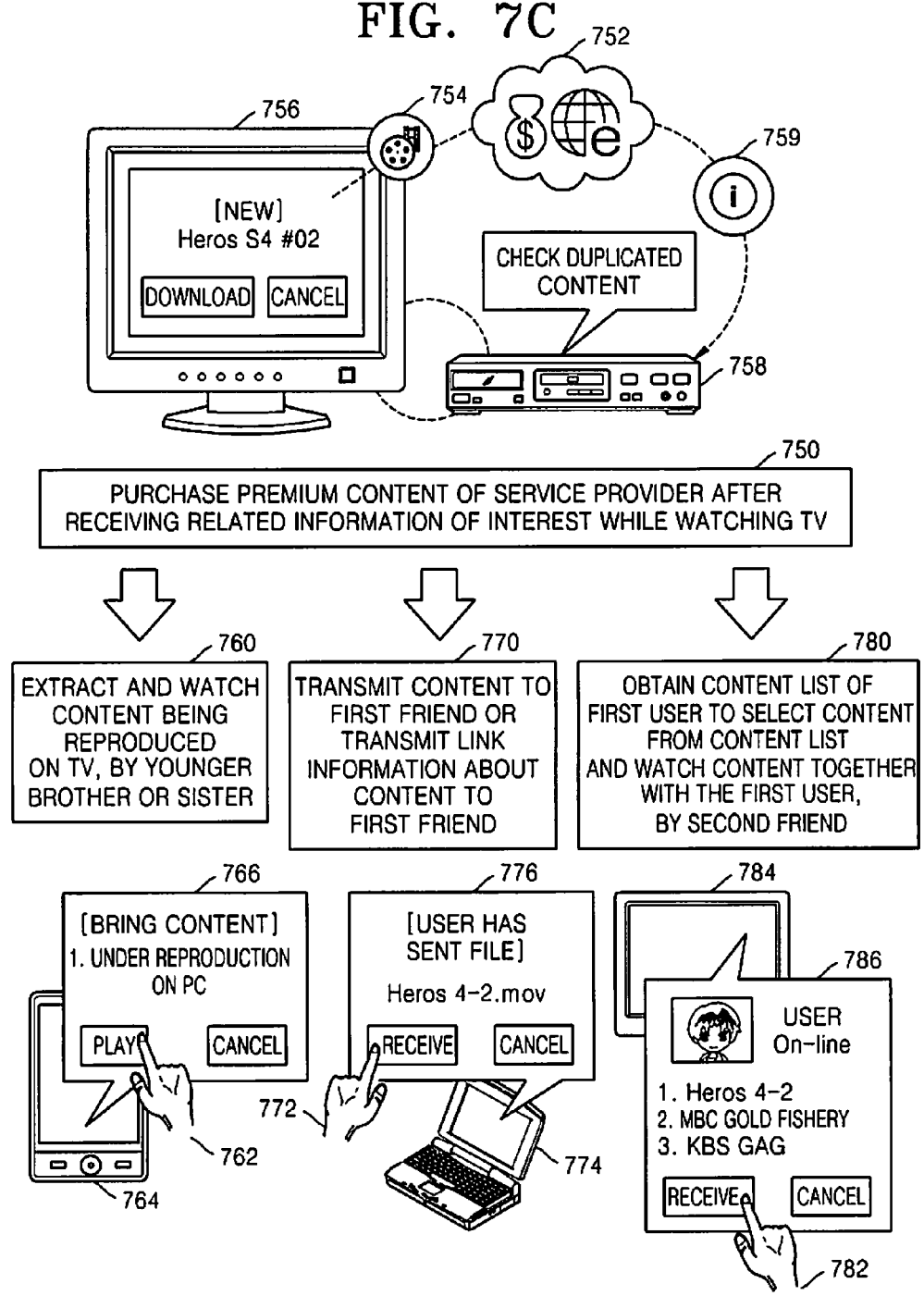

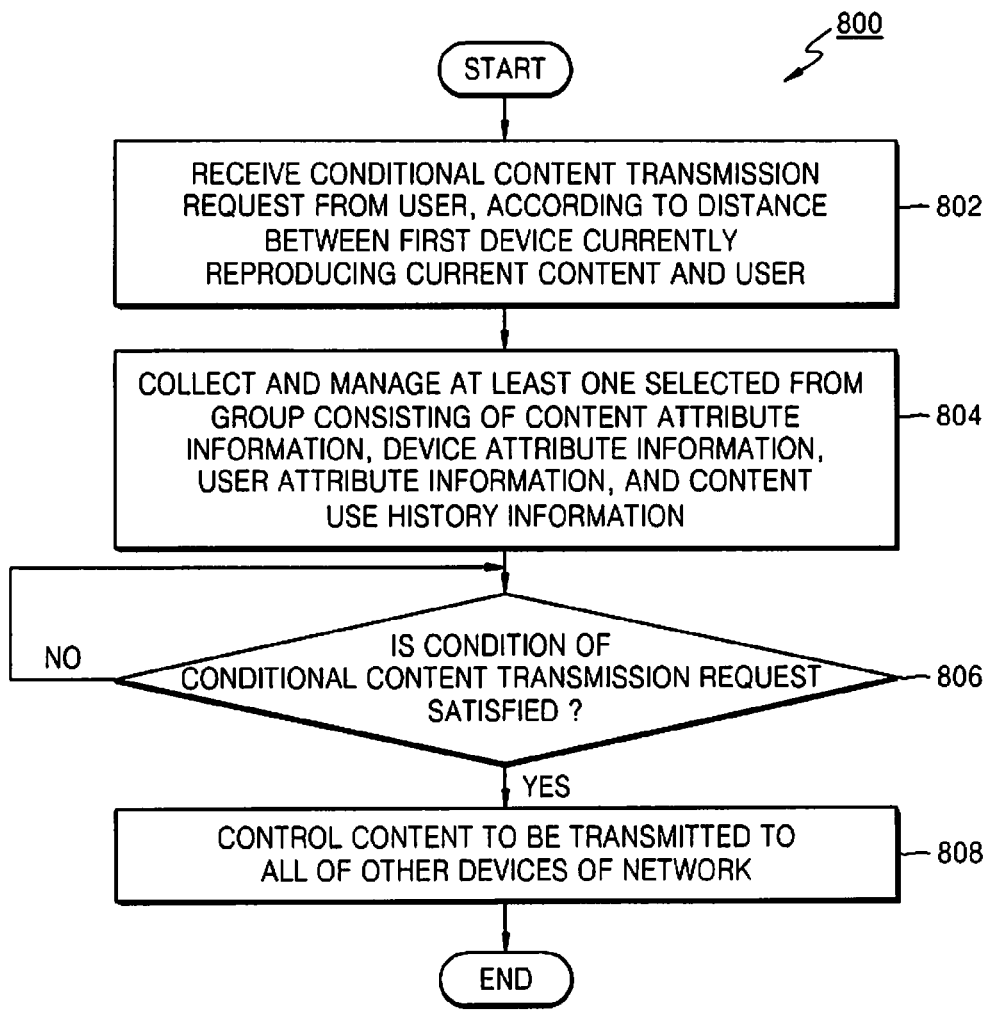

METHOD AND APPARATUS FOR MANAGING CONTENT SERVICE IN NETWORK BASED ON CONTENT USE HISTORY

PRIORITY

This application claims priority to Korean Patent Application No. 10-2009-0104429, which was filed in the Korean Intellectual Property Office on Oct. 30, 2009, the disclosure of which is incorporated herein in its entirety by reference.

BACKGROUND OF THE INVENTION

1. Field of the Invention

The present invention generally relates to integrated management of content services in a network.

2. Description of the Related Art

With recent developments in data communication and diversification of mobile devices, a user generally possesses various types of mobile devices. Since mobile devices capable of performing data communication can acquire various content through the web, commercial transactions of web-based content are widely in use.

Since content service providers provide numerous content through the web, users can easily acquire content for a mobile device. However, there is overflow of content and already-purchased content, duplicate content, new content, and the like are mixed in the content market.

SUMMARY OF THE INVENTION

Accordingly, the present invention provides integrated management of content services in a network.

According to an aspect of the present invention, a content service managing method is provided, which includes receiving a use request for content from a first device from among a plurality of devices that are capable of performing data communication and belong to a network; collecting and managing at least one of content attribute information about the content, device attribute information about the plurality of devices, user attribute information about at least one user of a device, and content use history information; and determining a method of obtaining the content, based on the selected information from the group consisting of the content attribute information, the device attribute information, the user attribute information, and the content use history information, and controlling the content to be provided to a second device which is to use the content from among the devices of the network.

According to another embodiment of the present invention, a content service management apparatus of a network capable of performing data communication is provided, which includes a content use request receiving unit which receives a use request for content from a predetermined device from among a plurality of devices belonging to the network; a related information managing unit which collects and manages at least one of content attribute information about the content, device attribute information about the plurality of devices, user attribute information about at least one user of the devices, and content use history information; and a content provision controlling unit which determines a method of obtaining the content, based on the at least one of the content attribute information, the device attribute information, the user attribute information, and the content use history information, and controlling the content to be provided to a second device which is to use the content from among the devices of the network.

According to another embodiment of the present invention, a content using apparatus belonging to devices that are capable of performing data communication and belong to a network is provided, which includes a content use requesting unit which requests at least one of the devices of the network to use content under the control of a content service management apparatus which managing a content service of the devices of the network; and a first device information managing unit which manages at least one of device attribute information about the content using apparatus, user attribute information about a user of the content using apparatus, content attribute information about content used by the content using apparatus, and content use history information and provides the selected information to the content service management apparatus. It is determined based on the content attribute information, the device attribute information, the user attribute information, and the content use history information whether the content is to be provided to the at least one device, and the content is provided from the devices of the network or from outside of the network.

According to another embodiment of the present invention, a content using apparatus belonging to devices that are capable of performing data communication and belong to a network is provided, which includes a second device information managing unit which manages at least one of device attribute information about the content using apparatus, user attribute information about a user of the content using apparatus, content attribute information about content used by the content using apparatus, and content use history information and provides the selected information to a content service management apparatus which manages a content service of the devices of the network; and a content receiving unit which receives the content from the devices of the network or from outside of the network under the control of the content service management apparatus. At a content using request of a predetermined device of the network, it is determined based on at least one of the content attribute information, the device attribute information, the user attribute information, and the content use history information whether the content is to be provided to the content using apparatus.

According to another embodiment of the present invention, a content using apparatus belonging to devices that are capable of performing data communication and belong to a network is provided, which includes a third device information managing unit which manages at least one of device attribute information about the content using apparatus, user attribute information about a user of the content using apparatus, content attribute information about content stored in the content using apparatus, and content use history information and provides the selected information to a content service management apparatus which manages a service content of the devices of the network; and a content transmitting unit which transmits the content to at least one second device of the network under the control of the content service management apparatus. At a content using request of a predetermined device of the network, it is determined based on at least one of the content attribute information, the device attribute information, the user attribute information, and the content use history information whether the content is to be provided to the second device.

BRIEF DESCRIPTION OF THE DRAWINGS

The above and other features and advantages of the present invention will become more apparent from the following description, taken in conjunction with the attached drawings, in which:

FIG. 3A is a flowchart and FIG. 3B is a schematic view of a content service providing and managing method according to an embodiment of the present invention;

FIG. 3C is a diagram illustrating a scenario implemented by a content service management apparatus according to an embodiment of the present invention;

FIGS. 7A and 7B are a flowchart and a schematic view of a content service providing and managing method according to a fifth embodiment, respectively;

FIG. 7C illustrates a scenario implemented by a content service management apparatus according to the fifth embodiment of the present invention;

FIGS. 8A and 8B are a flowchart and a schematic view of a content service providing and managing method according to a sixth embodiment, respectively.

DETAILED DESCRIPTION OF EMBODIMENTS OF THE INVENTION

A content service management apparatus and a content service managing method for providing content services to a device in a network including devices capable of performing data communication will now be described more fully with reference to FIGS. 1A through 8C, in which embodiments of the present invention are shown.

Figure 1A:
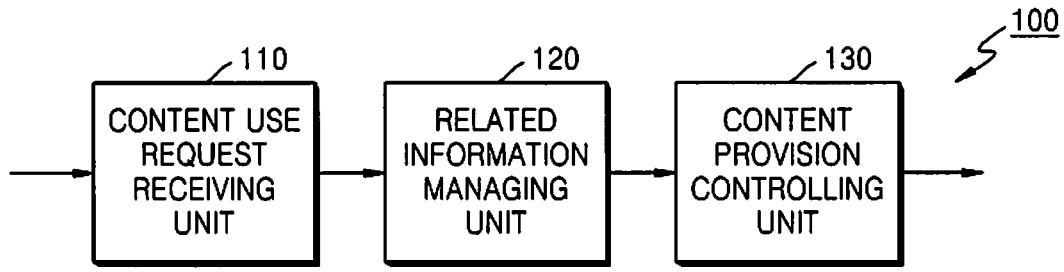
FIG. 1A is a block diagram of a content service management apparatus according to an embodiment of the present invention.

FIG. 1A is a block diagram of a content service management apparatus 100 according to an embodiment of the present invention.

Referring to FIG. 1A, the content service management apparatus 100 includes a content use request receiving unit 110, a related information managing unit 120, and a content provision controlling unit 130. Data communication between devices that can perform data communication and belong to a network, and data communication from an external source are discussed herein. Examples of the devices capable of performing data communication may include a desktop computer, a laptop computer, a netbook, a mobile phone, an MP3 player, a Portable Multimedia Player (PMP), a Television (TV), a home theater system, an electronic frame, etc.

For convenience of explanation, a device that requests to use content from among the devices of the network is referred to as a first device, a device that receives a requested content from among the devices is referred to as a second device, and a device that provides the requested content from among the devices is referred to as a third device.

Referring to FIG. 1, the content use request receiving unit 110 receives a request to use content from the first device from among the devices that are capable of performing data communication and belong to the network.

The first device may request for usage of a predetermined content. For example, the first device may request for usage of content designated by a user, content of interest found through the web, content stored in another device included in the network, a chargeable content to be purchased, etc.

The first device may also request for a search and recommendation of content that is optimal to be used in a current reproduction environment.

The content use request made by the first device may be a request for the first device to directly use content or a request for the other devices included in the network to use the content. For example, the first device may search for a device capable of reproducing a current content with the best video and audio qualities from among the devices included in the network, and may request to use content so that the found device reproduces the current content.

A service provider may analyze a content use pattern of the first device according to the content use history of the first device and provide a recommended content item including at least one content recommended to the first device. According to the present embodiment, the first device may request for usage of content selected from the recommended content item provided by the service provider.

The related information managing unit 120 collects and manages a variety of pieces of information required to provide content to a device. In order to determine a device to use a predetermined content, to determine content that a predetermined device is to use, or to determine content that a predetermined user is to use, information about a device and information about content (hereinafter, referred to as related information) is used.

The related information includes content attribute information about content, device attribute information about devices, and user attribute information about at least one user who uses the devices. The related information may further include content use history information of the devices. Electronic Program Guide (EPG) information, information about a new content list and a content providing schedule, and the like, which are provided by a service provider, may be obtained as the related information.

The content attribute information may be set differently for each content, or the same content attribute information may be set for all of the content of a predetermined group. For example, the content attribute information may include a Content ID (CID) of the content and log data of the CID. The content attribute information may also include information about the location, video quality, resolution, audio quality, volume, type, and genre of the content. The content attribute information may also include information about a parent control on the content, a usage authority, a reproduction history of the content, a user, and a used device, and the like.

The device attribute information may be set differently for each device, or the same device attribute information may be set for all of the devices of the network.

The device attribute information may include information about the performance of a device, such as, an implementable codec type, a storage capacity, a display resolution, and the like.

The device attribute information may include a current location of a device, a network ID of the device, a user, and information about a relation of the device such as a distance between the device and the user, and the like.

The device attribute information may include, as information about a current status of a device, information about an on/off mode of the device, availability thereof, an operation wait/ready state thereof, a wake-up/sleep mode state thereof, and the like.

The device attribute information may include, as information about the capability of a device, information about a display capability of the device, a message service capability thereof, a multimedia recording capability thereof, transcoding or non-transcoding, a multimedia editing capability thereof, a multimedia encoding capability, a multimedia decoding capability, and the like.

The user attribute information may be set differently for each user, or the same user attribute information may be set for all of the users who have access to devices. According to the present embodiment, the user attribute information may include information about a use authority of a user with respect to devices, a use authority to content, a network ID, a use history of the user with respect to the content, a user domain, a user account in a Digital Entertainment Content Ecosystem (DECE), the location of the user, and the like.

The content use history information may include a variety of information, such as information about a device used for each content and information about a user of the device. Content use history information on a user side may include a variety of information, such as information about content used by each user and information about a device that uses content. Content use history information on a device side may include a variety of information, such as information about content used by each device and information about a user of a device that uses content. The content use history information may also include information about a device or a user who is to use a corresponding content in the future, as well as the history of usage in the past.

Examples of the variety of information included in the content use history information may include the storage location of content, a timestamp for when the content is used, a use completion timestamp, a use completion history, a use interruption history, a use reservation, whether the content has been registered or not in a product-of-interest item, and a the time when the content is available. Not-viewed content broadcasting information and information about the current situation of a new content update and the like, from among the content use history information, may be updated based on an EPG provided by a service provider.

According to an embodiment of the present invention, the content provision controlling unit 130 determines a method of obtaining the content, based on at least one of the content attribute information, the device attribute information, the user attribute information, and the content use history information of the related information managing unit 120, and controls the content to be provided to the second device that is to use the content from among the devices of the network. Content use of a device may include various operations that can be performed using the content, such as, transmission, reproduction, download, sharing, storage, and the like of the content. An operation of purchasing a chargeable content such as premium content or the like and downloading the chargeable content from a service provider may also correspond to the content use of the device.

The content provision controlling unit 130 may determine whether the content is repeatedly used, based on the content use history information and the content attribute information.

The content may be provided according to various content obtaining methods. According to an embodiment of the present invention, examples of a content obtaining method that can be selected by the content provision controlling unit 130 include a method in which the second device is connected to a network address where the content is located and downloads the content from the network address. The content provision controlling unit 130 may control the second device to obtain the content, by using methods such as a content use reservation, purchase of content provided by a service provider, selection of a recommended content, selection of a content having registered as a product-of-interest item, and the like.

Due to the use of the content provision controlling unit 130, the second device may transmit and receive content to and from the other devices of the network by receiving the content from the other devices of the network or by transmitting content having a format not supported by a current device to a device capable of transcoding and by receiving transcoded content. The content provision controlling unit 130 may control the second device to obtain the content by sharing content currently being used by the other devices in real time or by receiving content simultaneously together with all of the devices of the network.

The content provision controlling unit 130 may control the first and second devices to directly search for content and directly acquire the content from a location where the searched content is stored, by using the related information of the related information managing unit 120. In this case, the content service management apparatus 100 may only provide information used for content and device determination in order to control content transmission and reception between devices, without involving in the content transmission and reception.

The content provision controlling unit 130 may control the content service management apparatus 100 to search for content at the request of the first device and to receive the content from a location where the found content is stored and transmit the content to the second device. In this case, the content service management apparatus 100 may control the content transmission and reception between the devices by mediating overall operations including the content transmission and reception.

Alternatively, the content provision controlling unit 130 may control the content transmission and reception between the devices by instructing the devices of the network to transmit and receive content.

The content service management apparatus 100 may be one of the devices of the network, or may be installed in the first device, the second device, or the third device. The content service management apparatus 100 may be located outside the network or in an upper layer of the network in order to control the devices of the network.

Due to the use of the content service management apparatus 100, content use history of the devices of the network is managed, so that a device may be prevented from repeatedly using content. Because content and a reproduction device are selected based on the device attribute information, the content attribute information, and the user attribute information of the devices of the network, the content may be reproduced in an optimal environment, and the reproduction device may reproduce an optimal content.

Figure 1B:
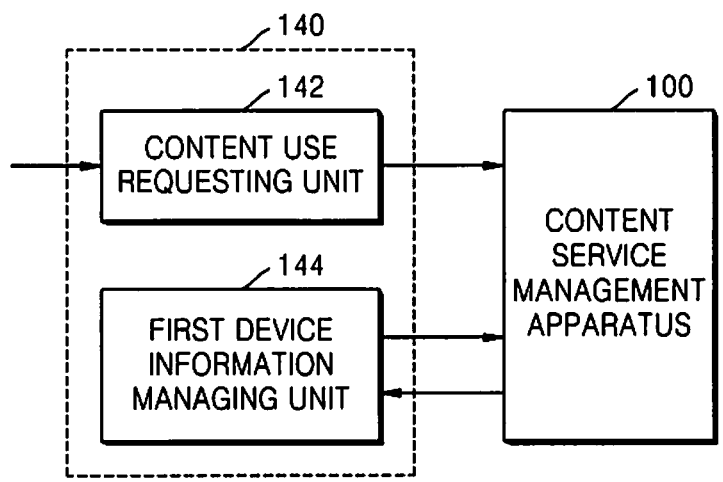
FIG. 1B is a block diagram of a first device that requests the content service management apparatus illustrated in FIG. 1 to provide content.

FIG. 1B is a block diagram of a first device 140 that requests the content service management apparatus 100 to provide content.

Referring to FIG. 1B, the first device 140 includes a content use requesting unit 142 and a first device information managing unit 144.

The content use requesting unit 142 requests the content service management apparatus 100 to allow at least one of the devices of the network to use content. The request made by the content use requesting unit 142 may be a request to use content in the network directly designated by a user or a request to use content located outside the network.

The first device information managing unit 144 manages at least one of device attribute information of the first device 140, user attribute information of a user of the first device 140, and content attribute information and content use history information about content used by the first device 140, and provides the at least one information to the content service management apparatus 100.

The content service management apparatus 100 may provide device attribute information, content attribute information, user attribute information, and the like of devices other than the first device 140 to the first device information managing unit 144. A variety of related information provided by the content service management apparatus 100, and existing information may affect determination of content that the content use requesting unit 142 is to request to be used.

Figure 1C:
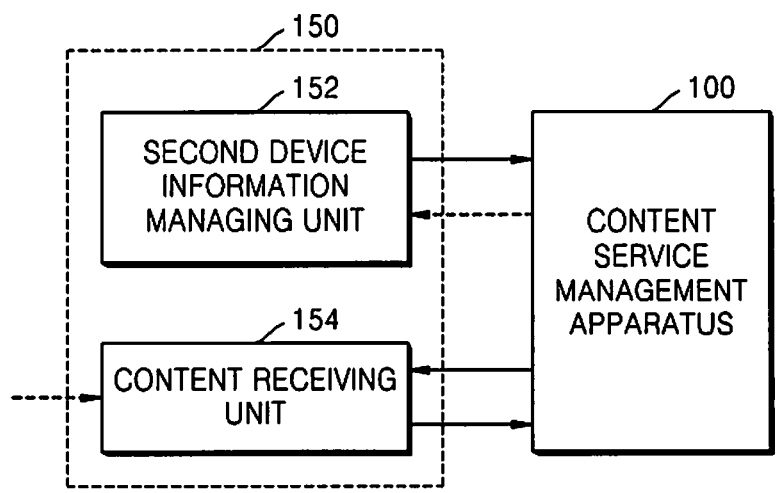
FIG. 1C is a block diagram of a second device that receives content from the content service management apparatus illustrated in FIG. 1.

FIG. 1C is a block diagram of a second device 150 that receives content under the control of the content service management apparatus 100.

Referring to FIG. 1C, the second device 150 includes a second device information managing unit 152 and a content receiving unit 154.

The second device information managing unit 152 manages at least one of device attribute information of the second device 150, user attribute information of a user of the second device 150, and content attribute information and content use history information about content used by the second device 150, and provides the at least one information to the content service management apparatus 100.

The content receiving unit 154 receives content from the devices of the network or from the outside of the network under the control of the content service management apparatus 100. The received content may be used by the second device 150. The content may be transmitted to the content receiving unit 154 via the content service management apparatus 100 or transmitted directly to the content receiving unit 154 from a storage location of the content.

Figure 1D:
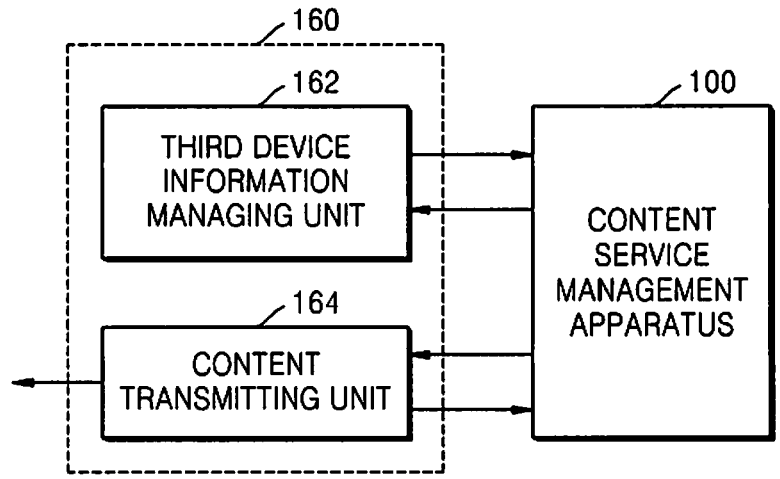
FIG. 1D is a block diagram of a third device that transmits content under the control of the content service management apparatus illustrated in FIG. 1.

FIG. 1D is a block diagram of a third device 160 that transmits content under the control of the content service management apparatus 100.

Referring to FIG. 1D, the third device 160 includes a third device information managing unit 162 and a content transmitting unit 164.

The third device information managing unit 162 manages at least one of device attribute information of the third device 160, user attribute information of a user of the third device 160, and content attribute information and content use history information about content stored in the third device 160, and provides the at least one information to the content service management apparatus 100.

The content transmitting unit 164 transmits content to at least one second device 150 of the network under the control of the content service management apparatus 100. The transmitted content may be used by the second device 150. The content may be transmitted from the content transmitting unit 154 to the second device 150 via the content service management apparatus 100 or transmitted from the content transmitting unit 154 directly to the second device 150.

In a network including the first device 140, the second device 150, and the third device 160, which are managed by the content service management apparatus 100, the content of the third device 160 may be transmitted to and used by the second device 150 at the request of the first device 140, based on the device attribute information, the user attribute information, and the content use history information included in the first device information managing unit 144, the second device information managing unit 154, and the third device information managing unit 164.

In FIGS. 1B, 1C, and 1D, the first device 140, the second device 150, and the third device 160 are each separated from the content service management apparatus 100. Alternatively, a first device, a second device, or a third device may include the content service management apparatus 100 as an internal component. In this case, the devices of the network may not only perform their unique operations such as content use request, content use or content transmission, but also may manage content service provision.

Because the first device 140, the second device 150, and the third device 160 are divided according to their roles, if a single device stores content and a device capable of reproducing the content requests for content use, the first device 140, the second device 150, and the third device 160 may be all included as components in the single device.

Figure 2:
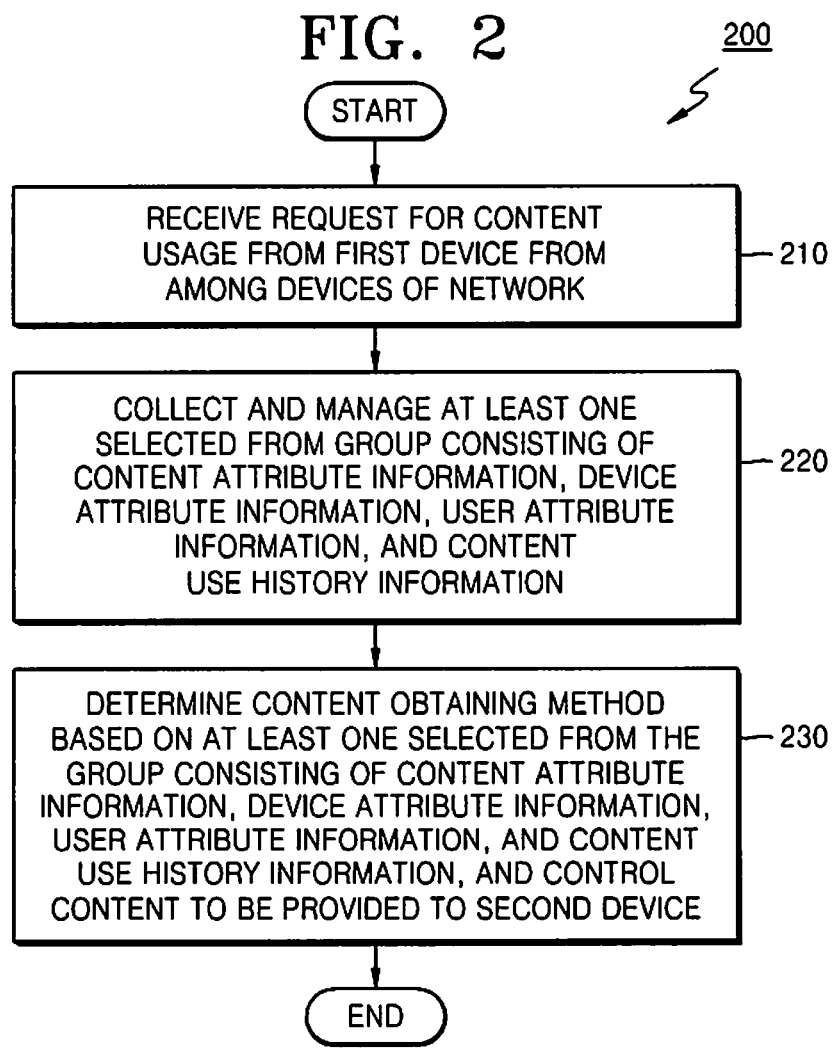
FIG. 2 is a block diagram of a content service managing method according to an embodiment of the present invention.

FIG. 2 is a block diagram of a content service management method 200 according to an embodiment of the present invention.

Referring to FIG. 2, in step 210, a request to use content is received from a first device from among the devices that are capable of performing data communication and belong to a network. The request may not only be a content use request made by the first device but also a content use request made by the other devices of the network.

In step 220, at least one of content attribute information about the content, device attribute information about the devices, user attribute information about at least one user of the devices, and content use history information is collected and managed.

In step 230, a method of obtaining the content is determined based on at least one of the content attribute information, the device attribute information, the user attribute information, and the content use history information, and the content is controlled to be provided to a second device which is to use the content from among the devices of the network.

The content may be found from outside the network or may be stored in another device of the network. Examples of the method of obtaining content include a method of downloading the content directly from a network address and a method of receiving the content from a third device. The second device may share the content with the third device in real time. The first device may remotely control content transmission and reception between the second device and the third device.

Various embodiments of a content providing method based on the content service managing method 200 will now be described in detail with reference to FIGS. 3A through 8C.

Figure 3B:
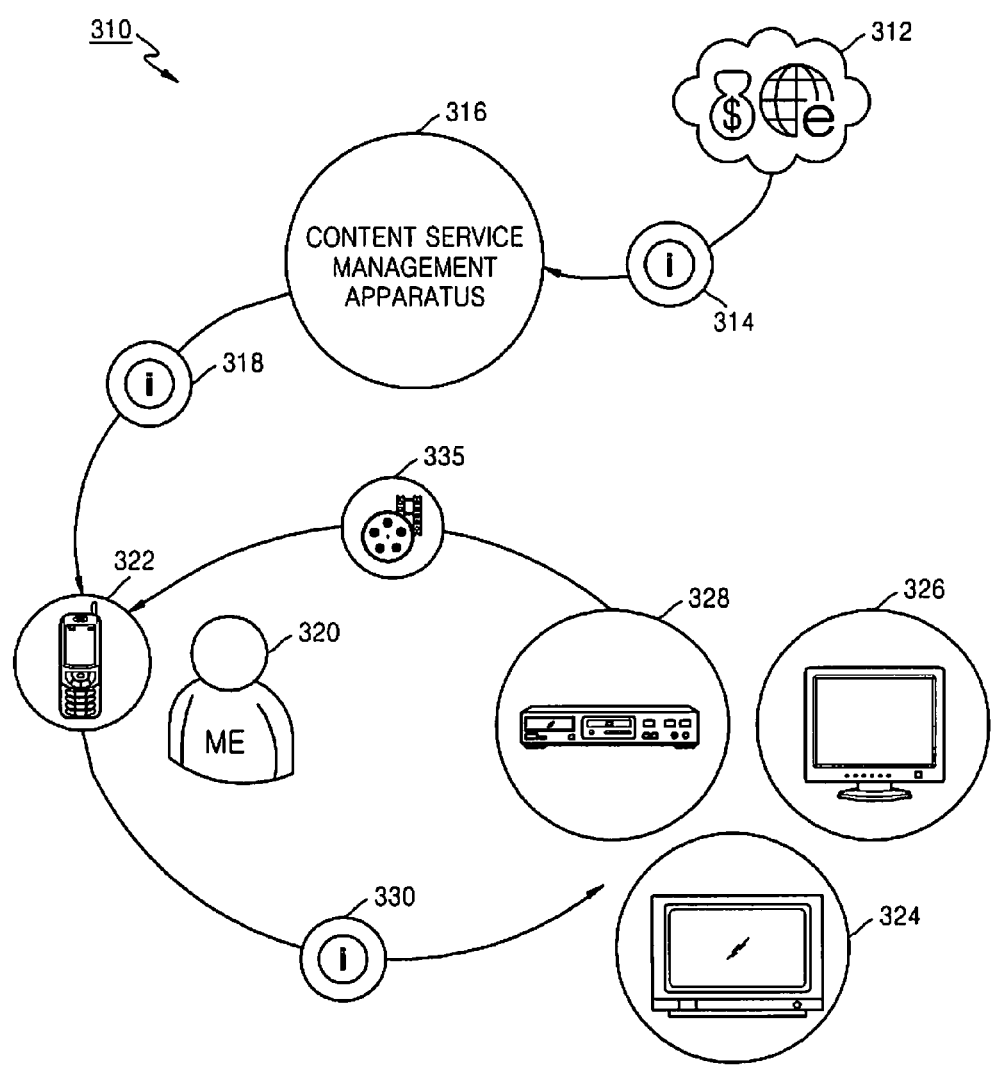
Figure 4A:
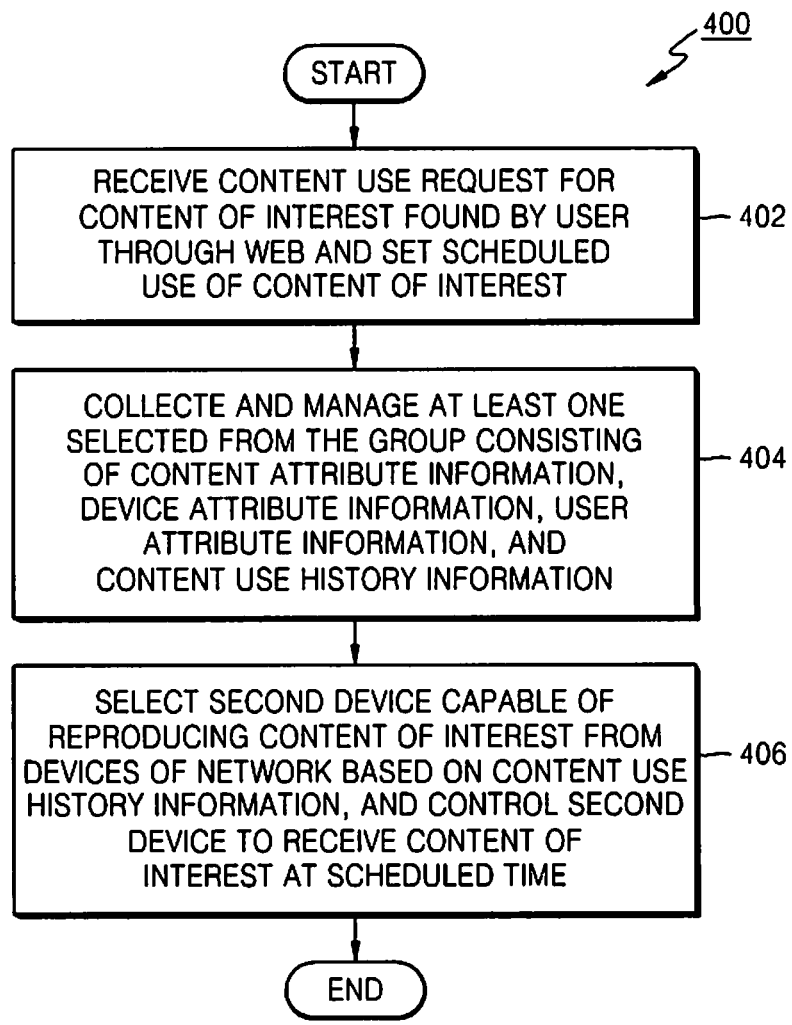
FIG. 4A is a flowchart and FIG. 4B is a schematic view of a content service providing and managing method according to an embodiment of the present invention.
Figure 4B:
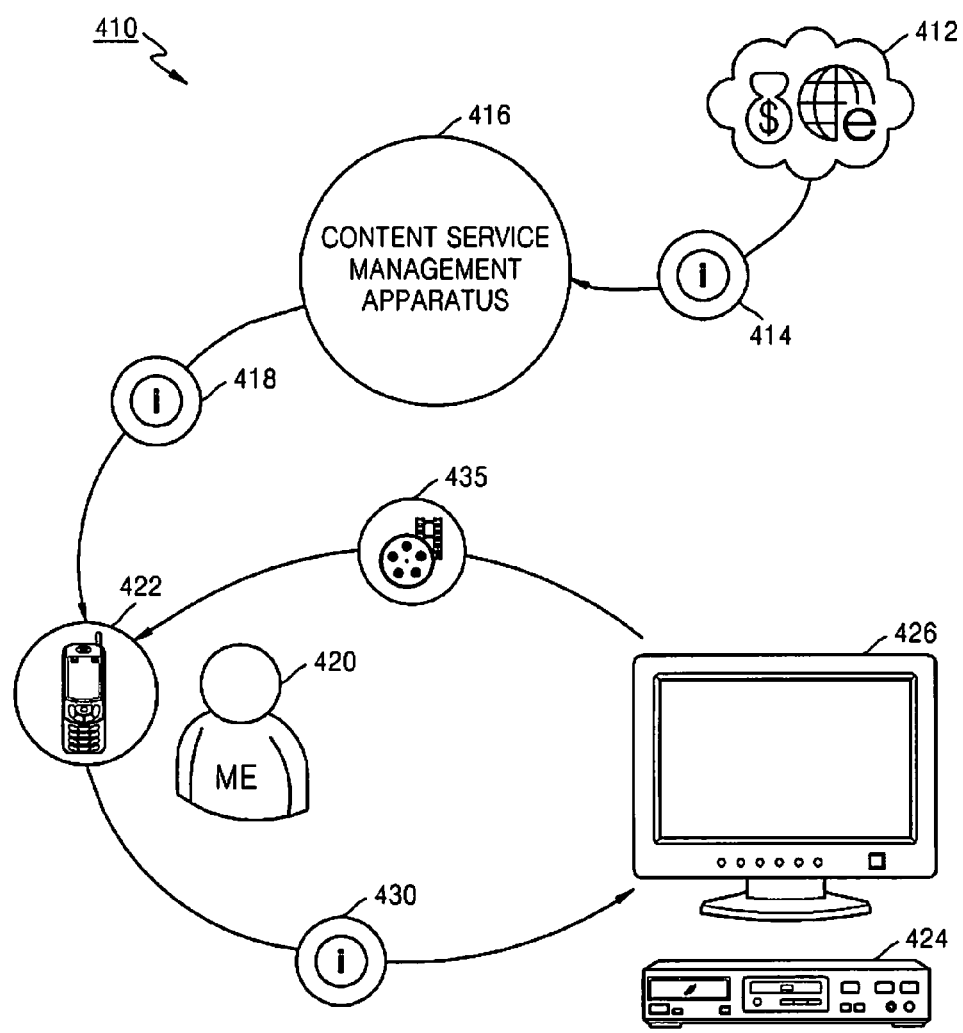
Figure 4C:
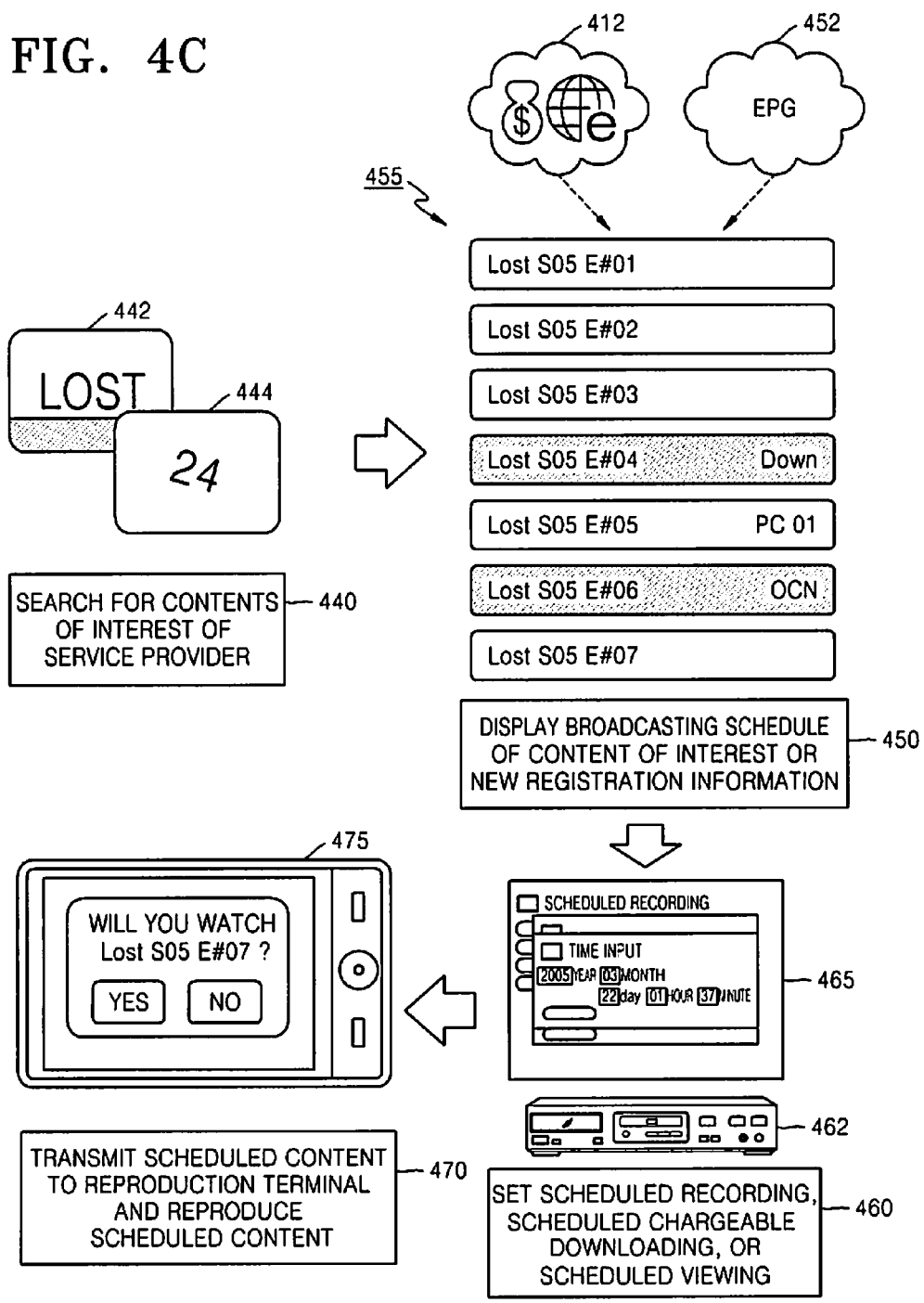
FIG. 4C is a diagram that illustrates a scenario implemented by a content service management apparatus according to an embodiment of the present invention.
Figure 5A:
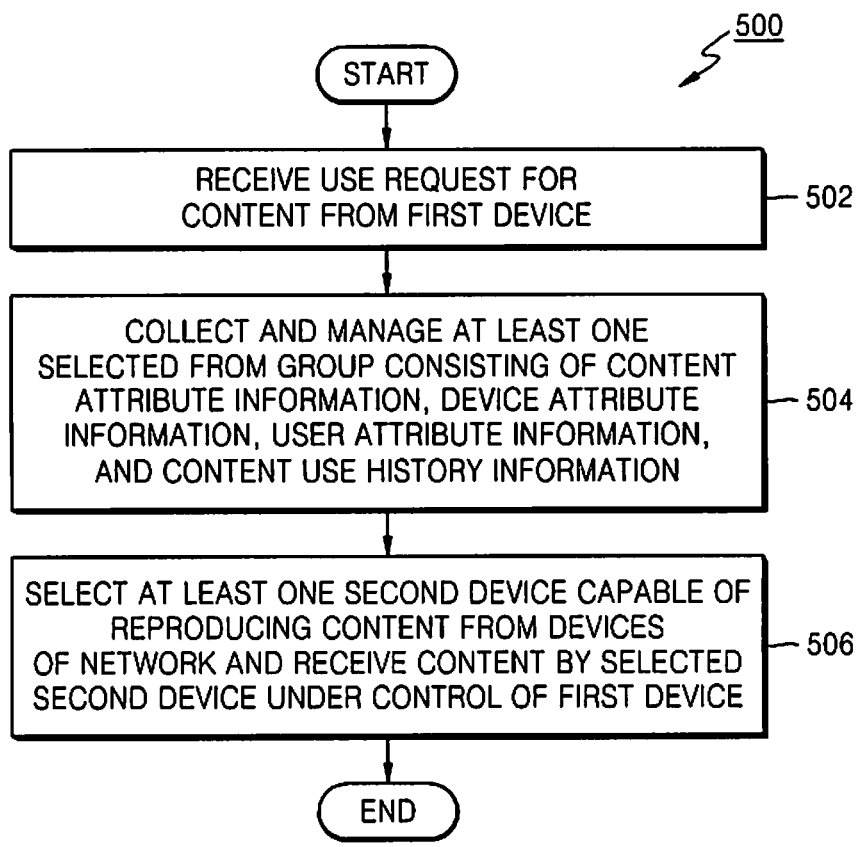
FIG. 5A is a flowchart and FIG. 5B is a schematic view of a content service providing and managing method according to an embodiment of the present invention.
Figure 5B:
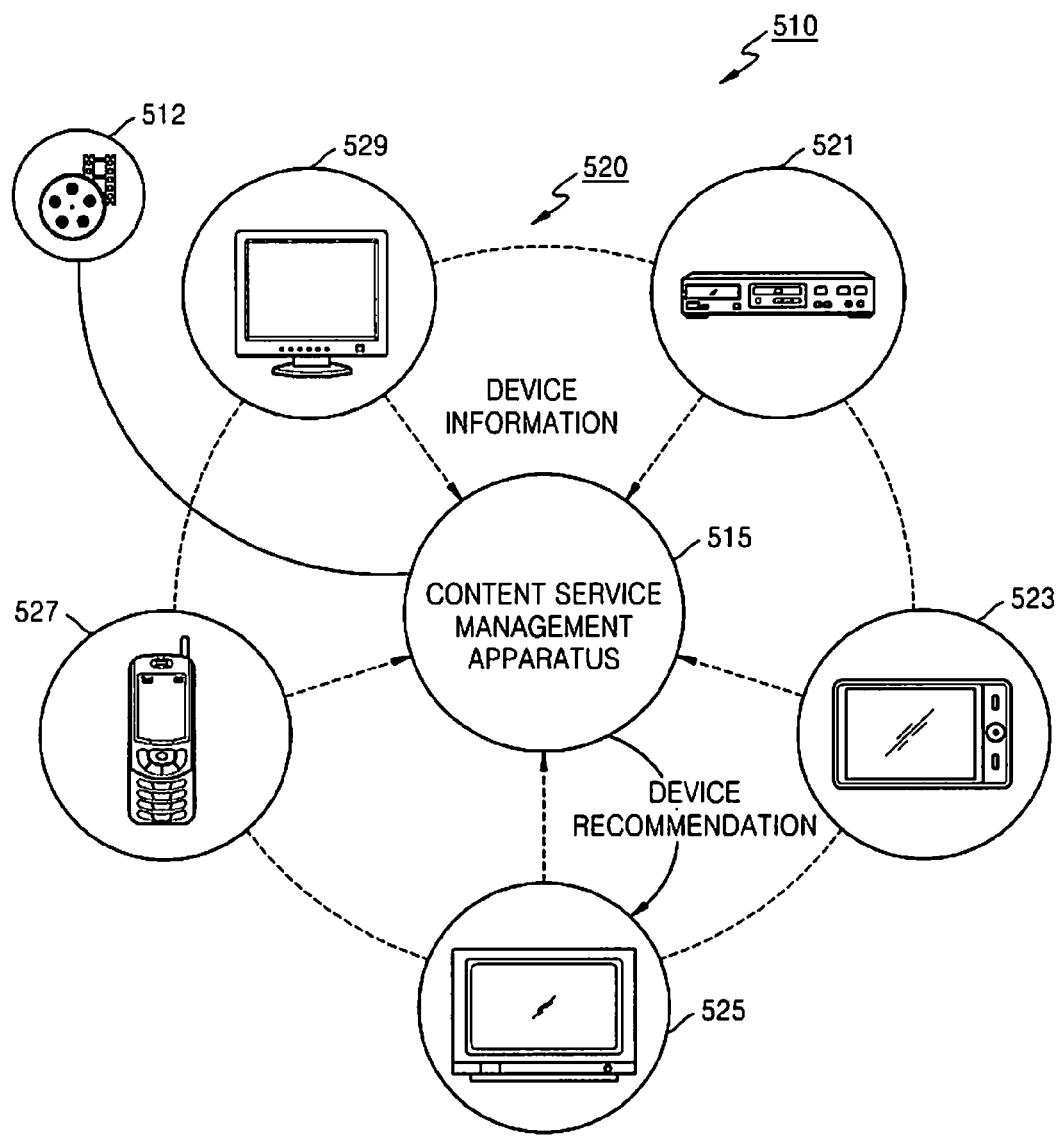
Figure 5C:
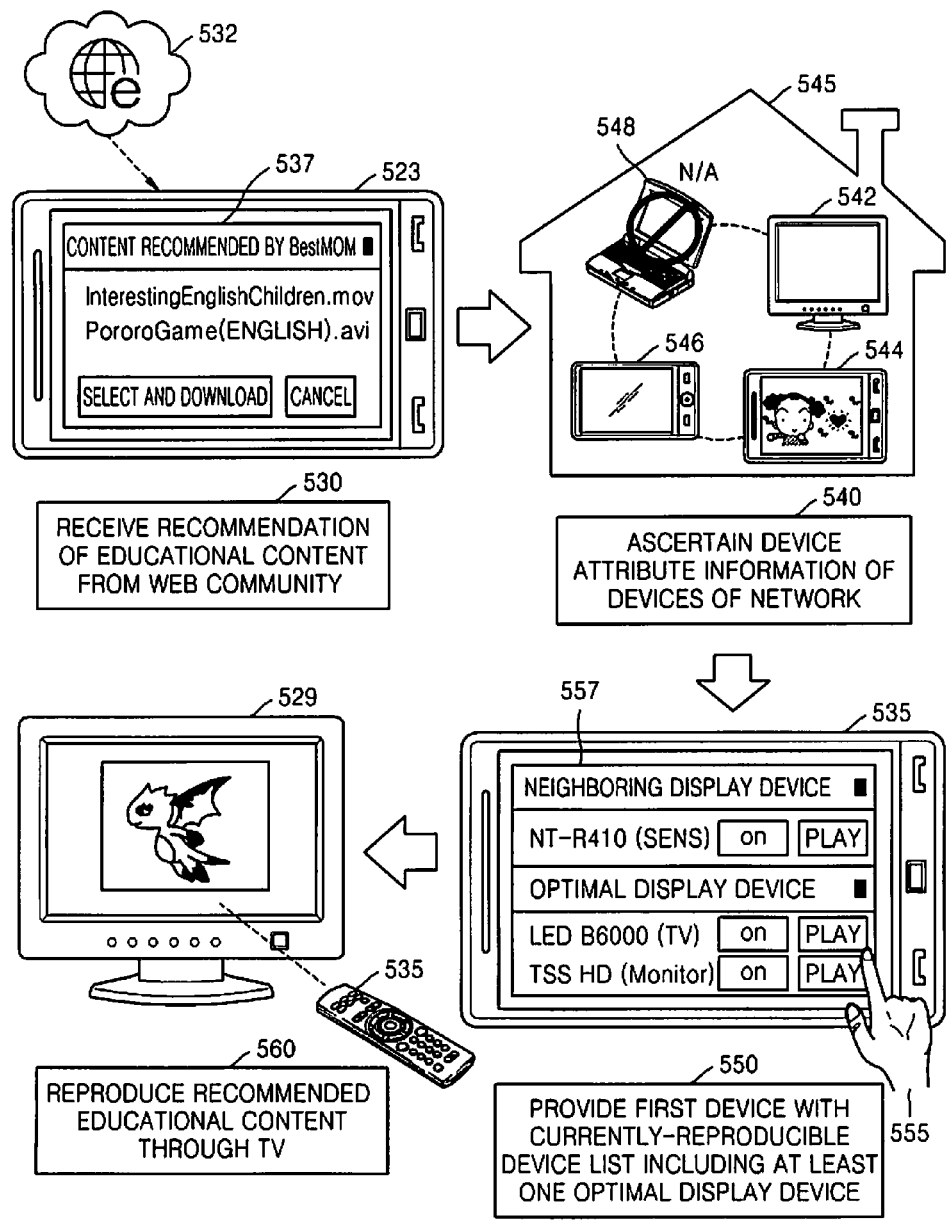
FIG. 5C is a diagram that illustrates a scenario implemented by a content service management apparatus according to an embodiment of the present invention.
Figure 6A:
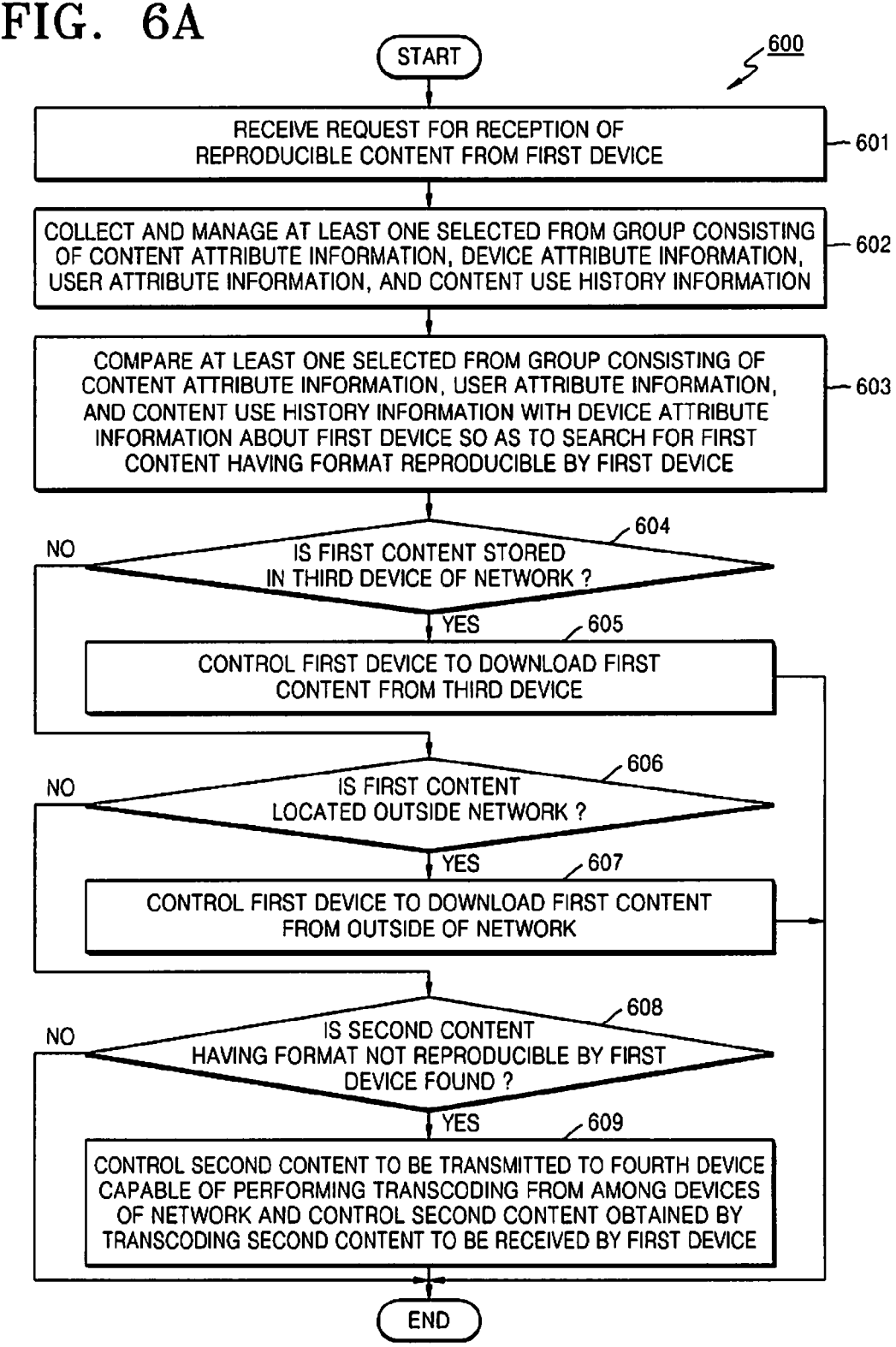
FIGS. 6A and 6B are a flowchart and a schematic view of a content service providing and managing method according to a fourth embodiment, respectively.
Figure 6B:
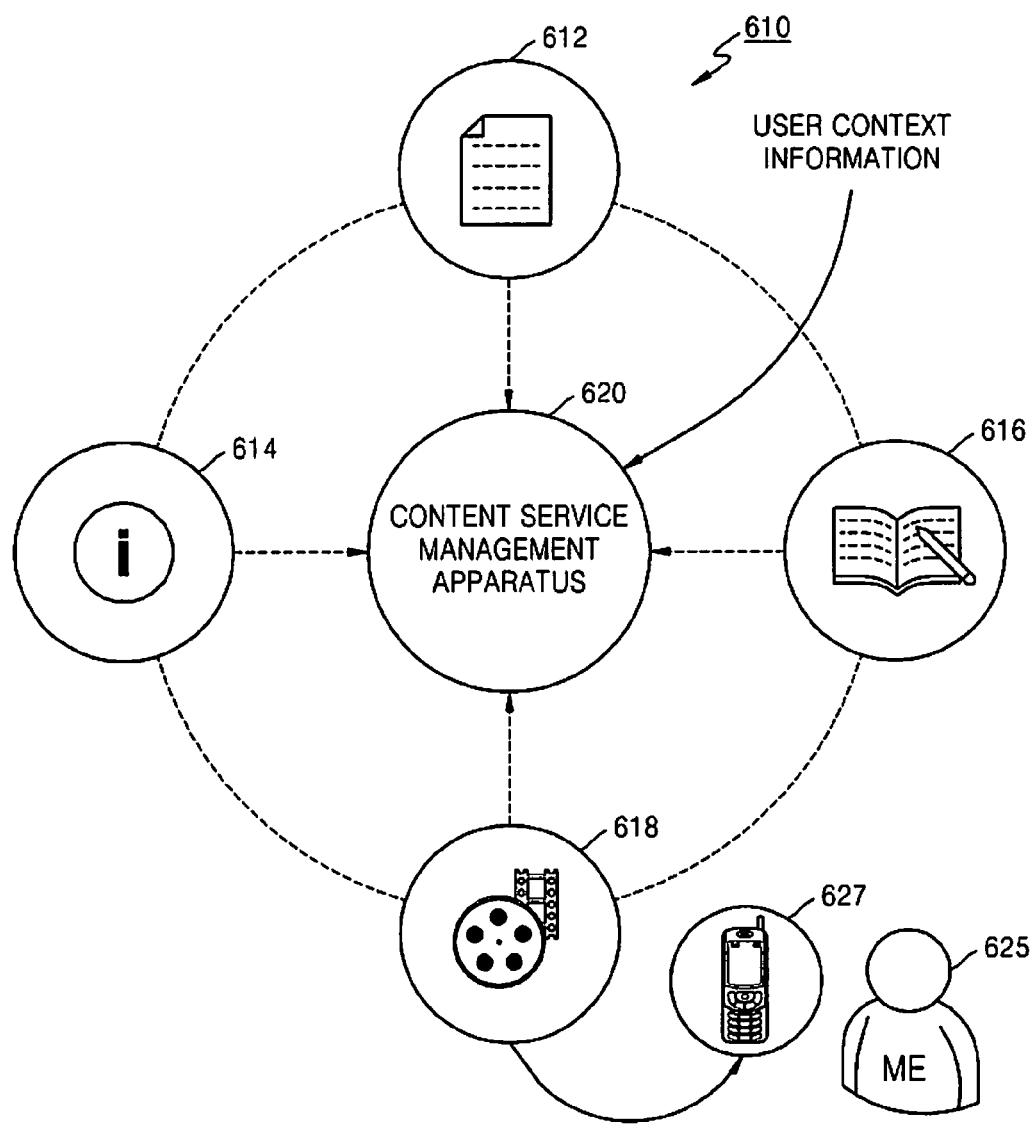
Figure 6C:
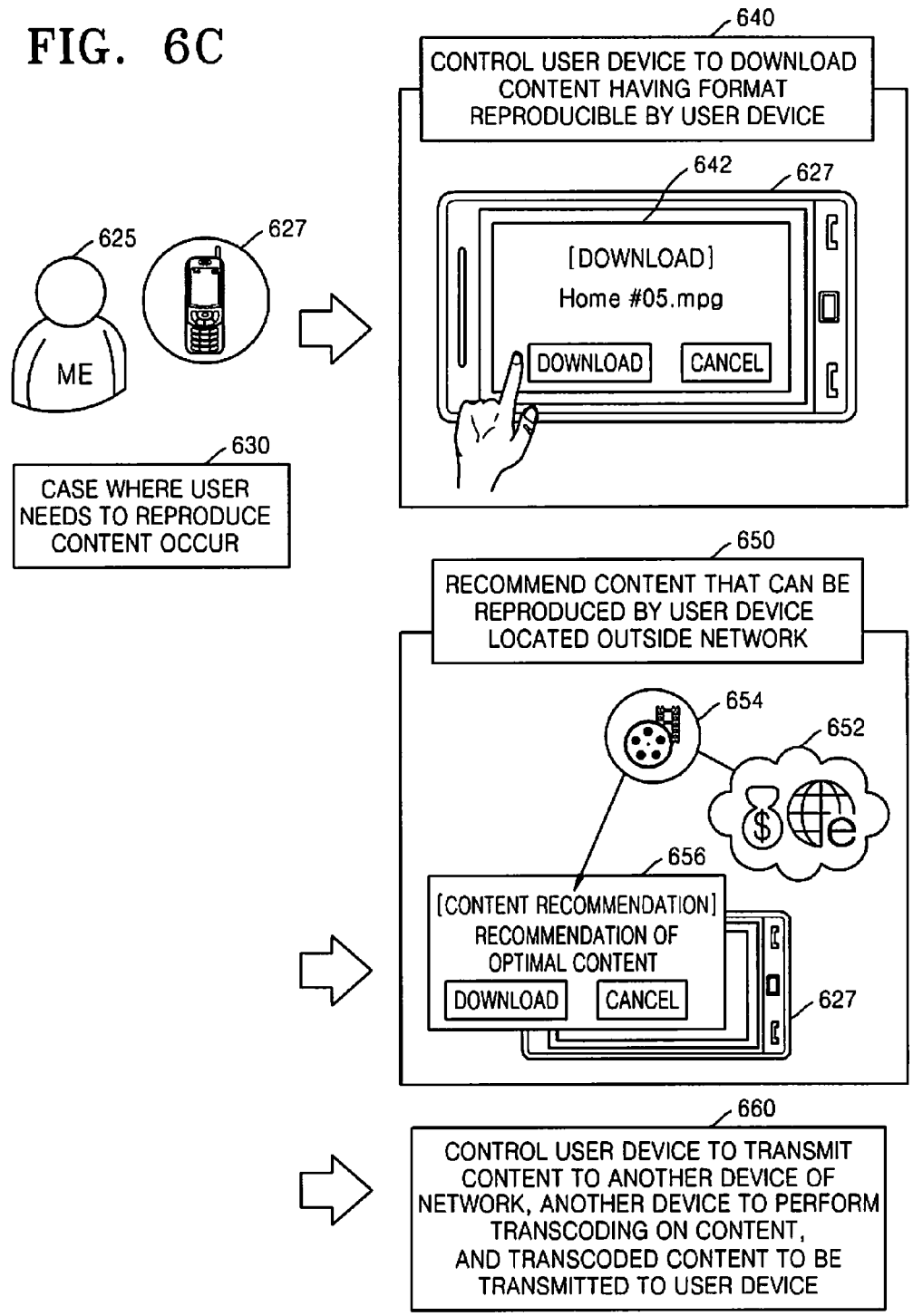
FIG. 6C illustrates a scenario implemented by a content service management apparatus according to an embodiment of the present invention.
Figure 7B:
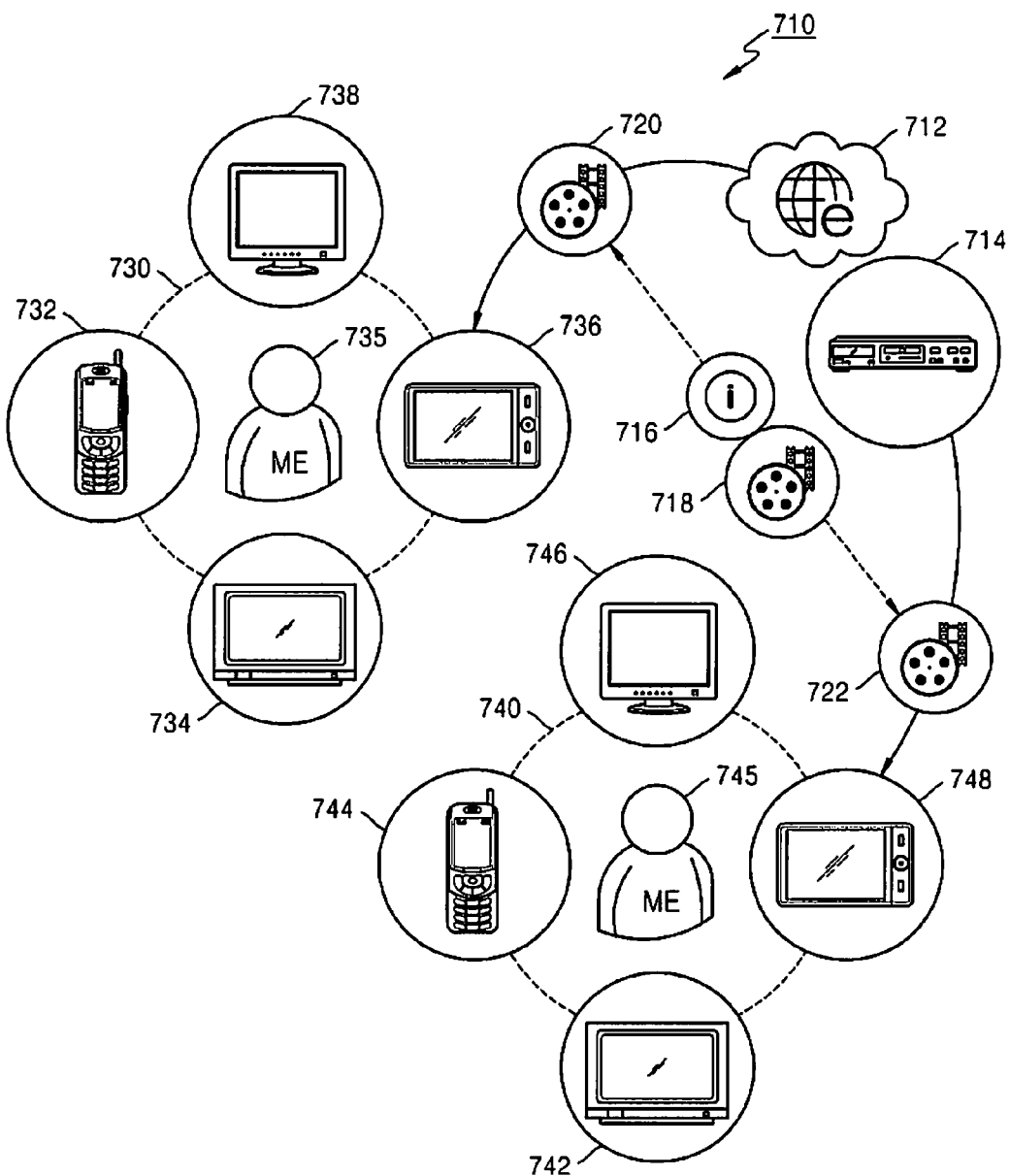
Figure 8B:
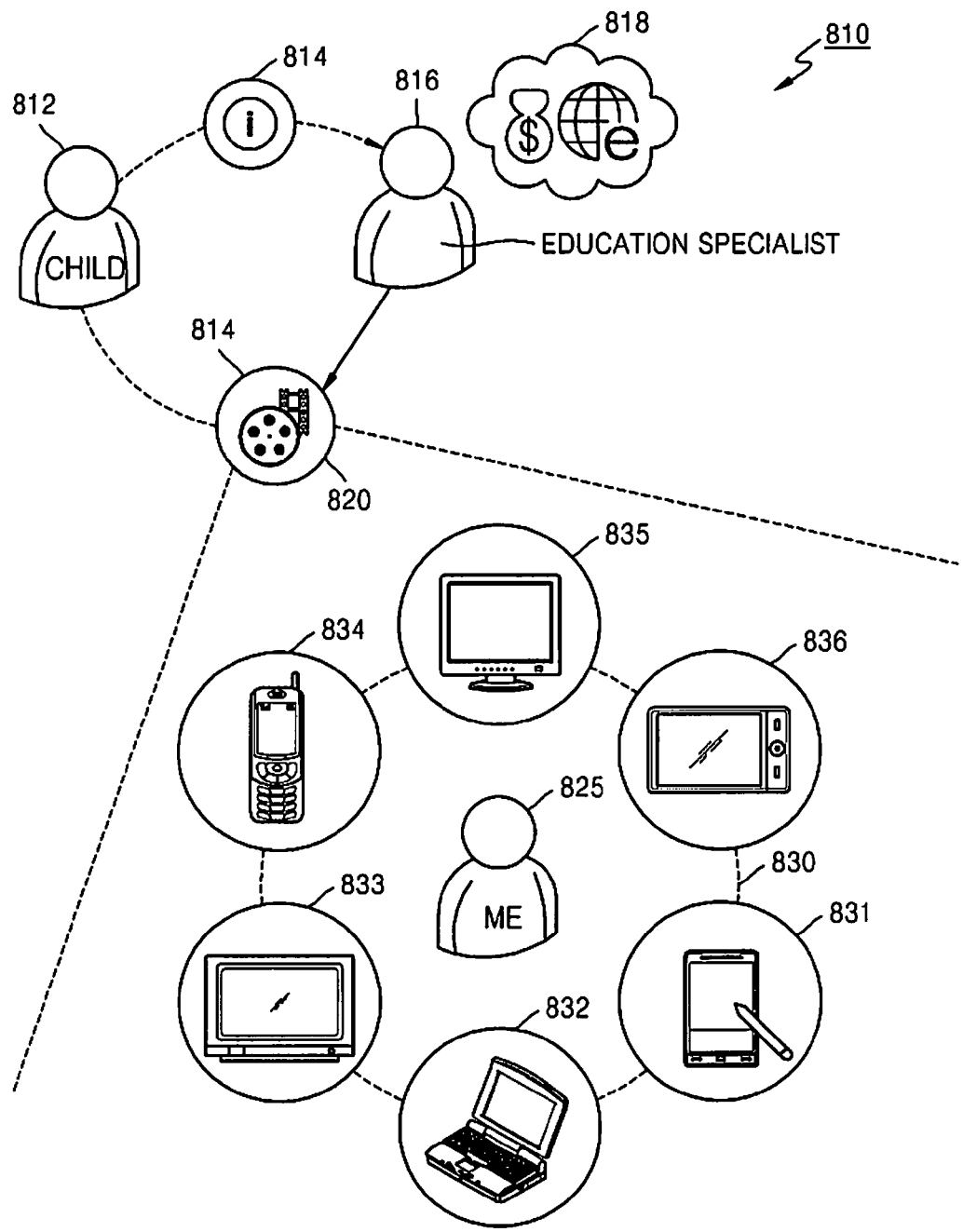
Figure 8C:
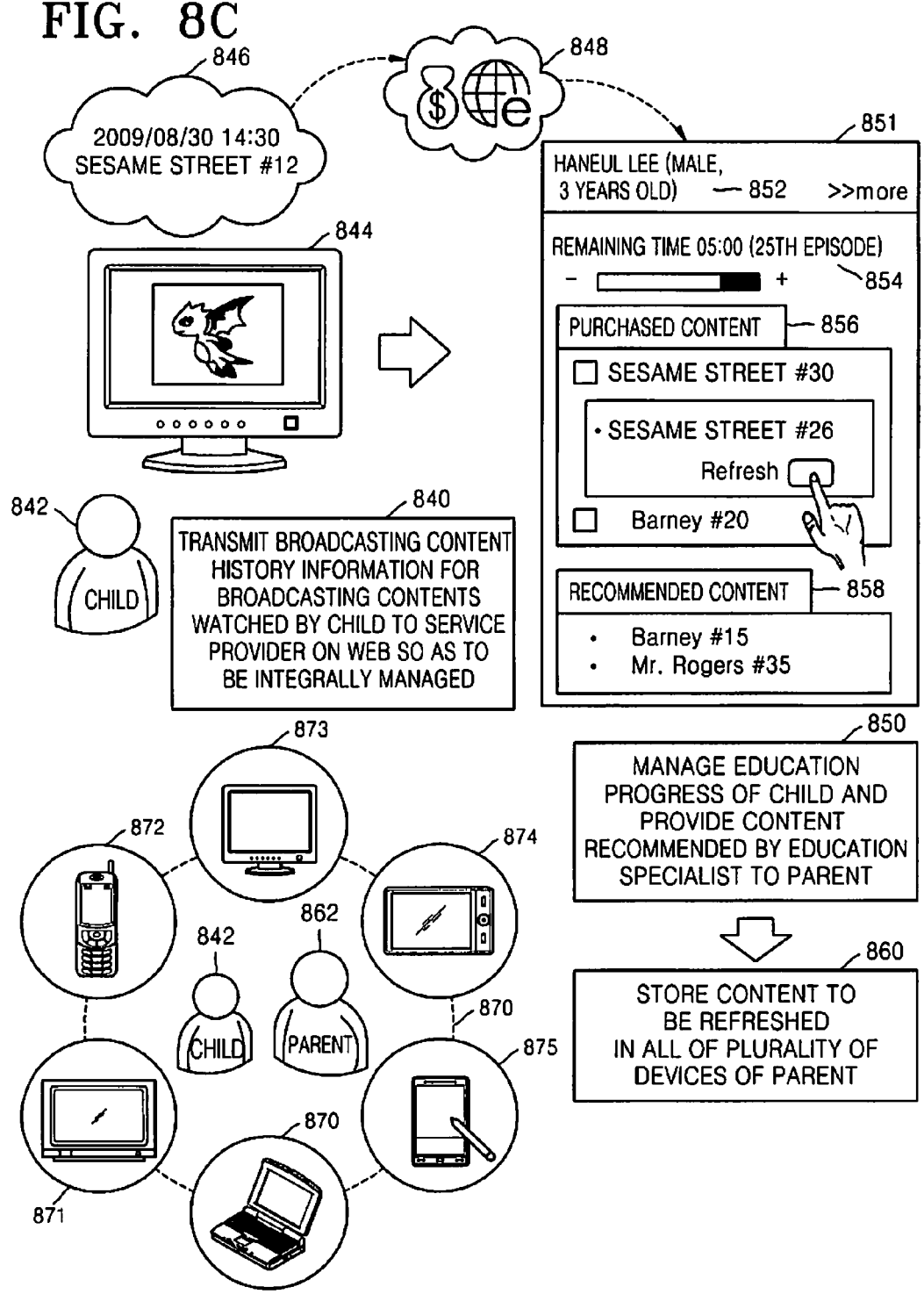
FIG. 8C illustrates a scenario implemented by a content service management apparatus according to the sixth embodiment.

FIGS. 3A, 3B, and 3C illustrate a scenario in which a duplicate purchase of a chargeable content is prevented based on a content use history. FIGS. 4A, 4B, and 4C illustrate a scenario in which scheduled use of content is performed based on the content use history. FIGS. 5A, 5B, and 5C illustrate a scenario in which an optimal device for reproducing content is selected. FIGS. 6A, 6B, and 6C illustrate a scenario in which content capable of being reproduced by a device is selected. FIGS. 7A, 7B, and 7C illustrate a scenario in which a plurality of users and a plurality of devices use content. FIGS. 8A, 8B, and 8C illustrate a scenario in which a parent manages content for child education according to a content viewing history of children.

FIGS. 3A and 3B are a flowchart and a schematic view, respectively, of a content service providing and managing method according to an embodiment of the present invention and FIG. 3C illustrates a scenario implemented by a content service management apparatus according to an embodiment of the present invention.

In FIGS. 3A, 3B, and 3C, a duplicate purchase of a chargeable content is prevented based on the content use history.

Referring to FIG. 3A, which is the flowchart of a content service managing method 300, in step 302, a chargeable content purchasing request is received from a first device. In step 304, at least one of content attribute information about a chargeable content, device attribute information of the devices of the network, user attribute information, and content use history information about the chargeable content is collected and managed.

In step 306, a third device that stores the already-purchased chargeable content is searched for from the devices of a network, based on the content use history information about the chargeable content requested to be purchased, and the chargeable content stored in the third device is controlled to be transmitted to the first device. The third device that stores the already-purchased chargeable content may be searched for by comparing the content attribute information about the chargeable content with the device attribute information of the devices of the network.

Referring to FIG. 3B, which is a schematic view of a content service providing and managing method 310 according to an embodiment of the present invention, a first device 322 of a user 320 requests for purchase of a chargeable content of a service provider 312. A content service management apparatus 316 may receive content attribute information 314 about the chargeable content from the service provider 312. The content service management apparatus 316 may provide the first device 322 with content purchasing/holding history information 318 from among user attribute information about the user 320.

The first device 322 may search for a device that stores the corresponding chargeable content purchased from the service provider 312 from devices 324, 326, and 328 included in a network, by comparing the content purchasing/holding history information 318 with device attribute information 330.

The content attribute information 314 may include a content location, a content type, a content use authority, a parent control on the content, etc. The device attribute information 330 may include network ID information of a corresponding device, standby mode information thereof, system capability information such as a storage space, a codec, a transcoder, etc., and other information.

For example, a device in which a storage location from among the content purchasing/holding history information 318 is consistent with information about a content location from among the device attribute information 330 may be searched for, and thus, the first device 322 may receive a desired content 335 from the found device from among the devices 324, 326, and 328.

Referring to FIG. 3C, which illustrates a content service management apparatus 352 according to an embodiment of the present invention, the content service management apparatus 352 corresponds to the content service managing apparatus 100.

In step 340, the content use request receiving unit 110 according to the first embodiment searches for content of interest of the service provider 312 and receives a purchase request for the found content, by using a first device 345. The content service management apparatus 352 may mediate content transmission and reception between devices and may manage content service provision.

In step 350, a content provision controlling unit of the content service management apparatus 352 detects the location of the content of interest from the network before deciding to purchase of the content of interest. After receiving a signal from the second device 354 informing that the second device 354 holds the content of interest, the content provision controlling unit of the content service management apparatus 352 may deliver the signal received from the second device 354 to the first device 345. The first device 345 may display a notice window 356, notifying the location of the content of interest within the network, on a screen.

In step 360, the content provision controlling unit may receive the content of interest from the second device 354 and transmit the content of interest to the first device 345, and the first device 345 may display an image 362 for the received content of interest. Accordingly, the purchase of the chargeable content may be decided after determining whether the chargeable content has already been purchased by the other devices of the network, so that a duplicate purchase of the chargeable content may be prevented.

Figure 3D:
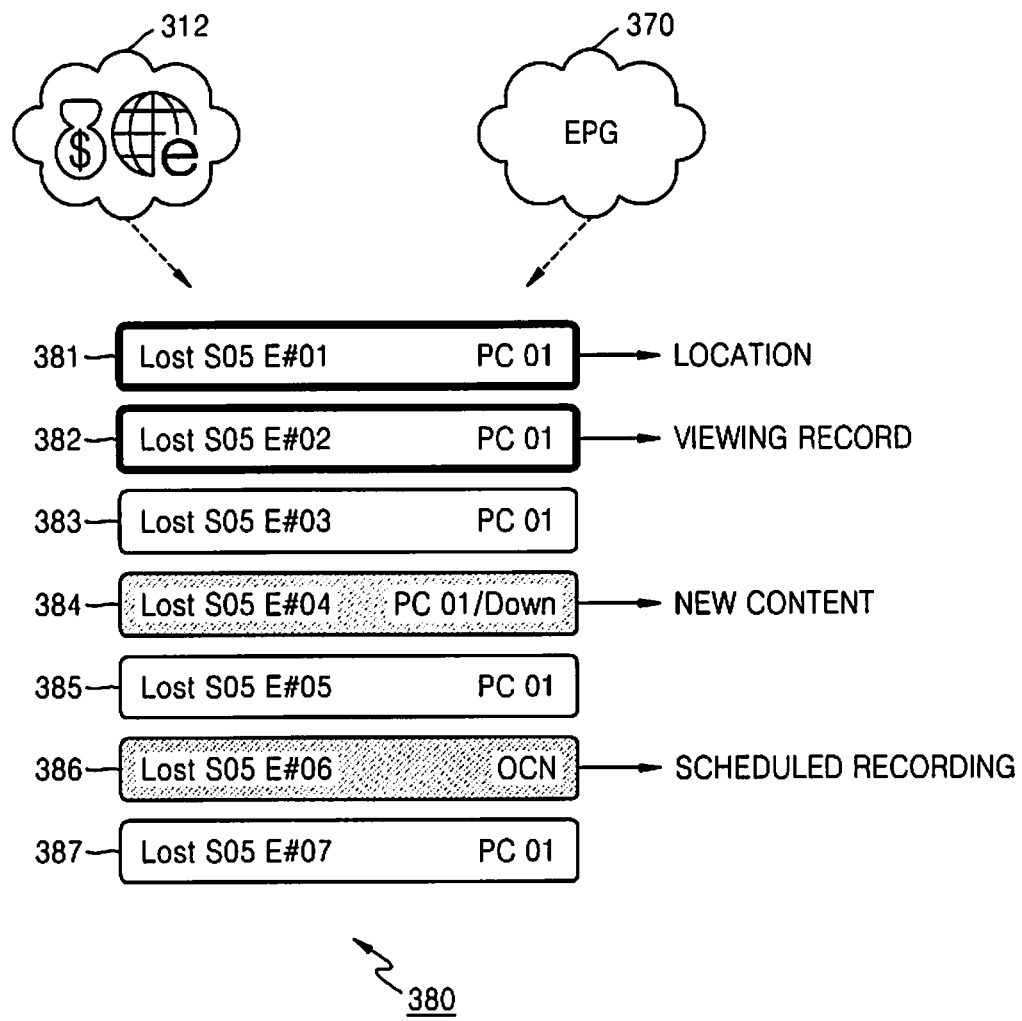
FIG. 3D is a diagram illustrating content purchasing/holding history information according to the first embodiment of the present invention.

The location of the content of interest within the network that has already purchased and stored the content may be detected based on content purchasing/holding history information 380 as illustrated in FIG. 3D.

FIG. 3D illustrates the content purchasing/holding history information 380 according to an embodiment of the present invention.

The content purchasing/holding history information 380 is a type of the content use history information of the content service providing apparatus 100. Items 381, 382, 383, 384, 385, 386, and 387 of the content purchasing/holding history information 380 indicate content name information ('Lost S05 E#01', 'Lost S05 E#02' . . . 'Lost S05 E#07'), storage location information ('PC 01'), viewing record information (whether an item boundary is highlighted), information about whether a new content is downloaded ('Down'), and scheduled recordable channel information ('OCN'). The content purchasing/holding history information 380 may be updated by the service provider 312 and an Electronic Program Guide (EPG) 370.

Accordingly, the content service providing apparatus 352, the first device 345, and the like may ascertain a content location by using the content purchasing/holding history information 380.

Figure 3E:
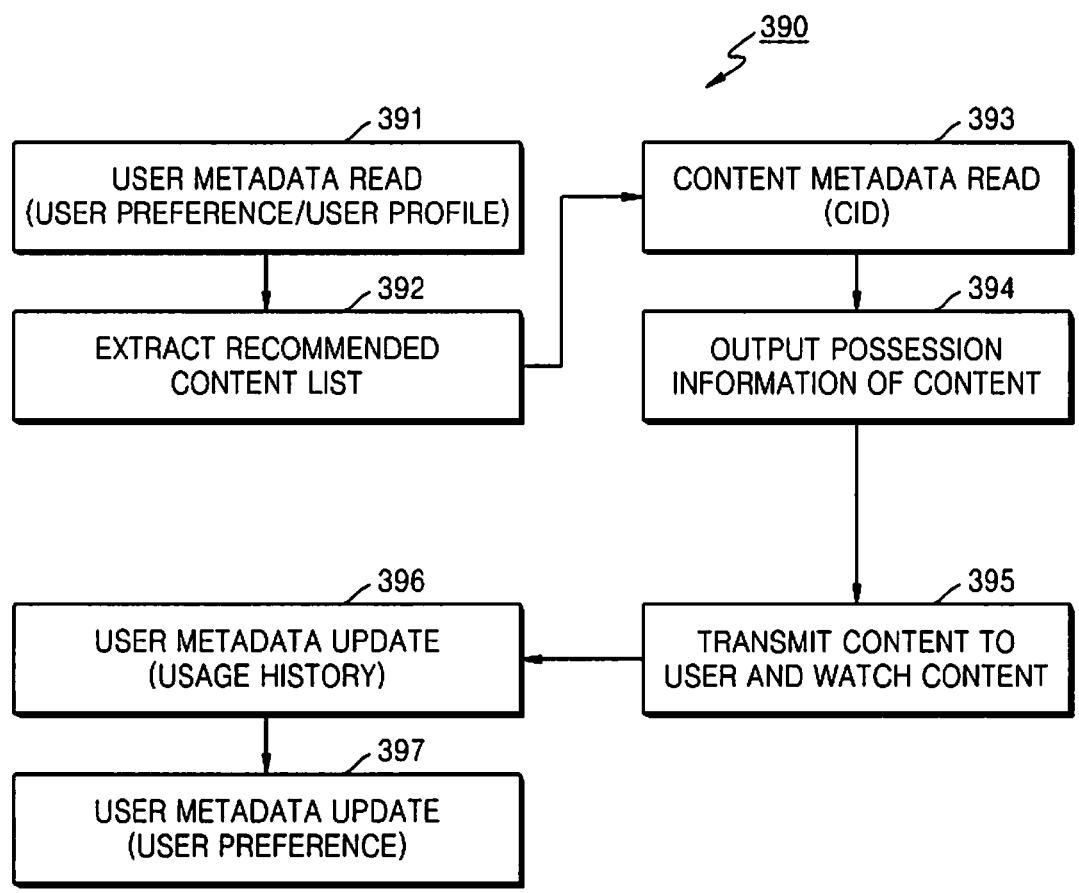
FIG. 3E is a flowchart of a content-of-interest purchasing method for preventing duplicate purchases according to an embodiment of the present invention.

FIG. 3E is a flowchart of a content-of-interest purchasing method 390 for preventing a duplicate purchase according to an embodiment of the present invention.

Referring to FIG. 3E, content-of-interest search and purchase is based on a user preference, a user profile, a user history for content and events used by a user, etc. Hereinafter, the content-of-interest purchasing method 390 corresponds to an embodiment in which a single device performs both content purchasing request and content reproduction.

In step 391, when a content purchasing request is generated from a user of the single device, user metadata is read. The user metadata includes user attribute information and information about a user preference, a user taste, a user profile, and the like. The user metadata may be provided by the device or a content provision managing server.

In step 392, a recommended content list is extracted based on the user metadata. The recommended content list may include content selected based on metadata about the user taste and metadata about the user profile that are included in the user metadata. A corresponding device may generate the recommended content list according to information about the user taste and the user profile. The recommended content list may be a list provided by a service provider or a material recommended by a network of users, such as a party, a community, or the like of the users.

In step 393, content metadata about content recommended from the recommended content list is read. The content metadata may include content attribute information and a CID. The CID may be generated based on Universal Unique Identifier (UUID)/International Standard Audiovisual Number (ISAN). The content metadata may be obtained from a content provider or the content provision managing server.

In step 394, possession information of content is output using the CID. It is determined whether a corresponding user is included as a possessor of the content. Duplicate purchases of the same content by a user may be prevented by using the CID.

In step 395, the corresponding content is purchased and transmitted from the service provider to a user, and the user views the content on a reproduction device. Content having no purchase histories may be transmitted based on the CID.

In step 396, the user metadata is updated according to the purchase and use of the content by the user. Information about content purchasing history or content use history of a user from among the user metadata may be updated. If the information about the content purchasing history or the content use history is defined in the content metadata, information about content purchasing history or content use history from among the content metadata may be updated. The user metadata of the device or the user metadata of the content provision managing server may be updated.

In step 397, the user metadata may be updated. Information about a user taste and a user preference from among the user metadata may be updated. The user metadata of the device or the user metadata of the content provision managing server may also be updated.

In steps 391, 392, 396, and 397, operations using user information such as the user metadata and information about a recommended content list for a user are performed. In step 393, 394, and 395, operations using content information such as the content metadata, the possessing information of content, transmission and viewing of the content, and the like are performed.

In steps 391, 392, 393, and 394, a preliminary operation for content purchase is performed. In steps 395, 396, and 397, an operation of updating the content use history and the user use history after the content purchase is performed.

The content service providing apparatus 352 of FIG. 3C may control the entire purchase of the content of interest according to the content-of-interest purchasing method 390. Alternatively, the content service providing apparatus 352 may control prevention and management of duplicate purchases by users performed in the operations 391 through 394, and transmission to a reproduction device, content viewing through the reproduction device, and user metadata updating in the operations 395, 396, and 397 may be controlled by the reproduction device.

More specifically, the user metadata may include metadata about a user preference including the content preferred by a user and the like, metadata about a user profile such as a user history and the like, and metadata about a user use history including content and events used and performed by the user. The event denotes an operation of a specific function such as a fast forward function, a skip function, a fast backward function, a repeat function, and the like, and may be used as a source for the metadata about the user preference.

For example, the user metadata "User Metadata" may include lower metadata of user preference metadata 'User Preference' and lower metadata of user profile metadata 'User Profile'. The user preference metadata 'User Preference' includes information about a video preferred by a user, 'Preferred Video', and information about an audio preferred by the user, 'Preferred Audio'. The information 'Preferred Video' may include information about a genre, a director, actors and actresses, a production company, and the like of the video, and the information 'Preferred Audio' may include information about a genre, a performer, a mood, a country, and the like of the audio. The user profile metadata 'User Profile' may include information about a hobby, an age, a gender, an address, and the like of the user.

Accordingly, content suitable for a user may be found and purchased using the user metadata, and duplicate purchases of content to be purchased may be prevented by checking the CID or the like of the content before the content is purchased.

As illustrated in FIGS. 3A, 3B, 3C, 3D, and 3E, and described above, duplicate purchases of a chargeable content may be prevented based on the content and the content use history of a user, and a good quality of content may be collected.

FIGS. 4A and 4B are a flowchart and a schematic view, respectively, of a content service providing and managing method according to an embodiment of the present invention. FIG. 4C illustrates a scenario implemented by a content service management apparatus according to an embodiment of the present invention.

In FIGS. 4A, 4B, and 4C, scheduled use of content is performed based on content use history.

Referring to FIG. 4A, in step 402, a content use request for content of interest found by a user through the web is received, and a scheduled use of the content of interest is set. In step 404, at least one of content attribute information about the content of interest, device attribute information, user attribute information, and content use history information is collected and managed.

In step 406, a second device capable of reproducing the content of interest is selected from the devices of a network is selected based on the content use history information, and the second device is controlled to receive the content of interest at a scheduled time, based on scheduled time information included in scheduled use setting information about the content of interest and content available time information included in the content use history information.

The second device may be selected based on log data of a CID included in the content attribute information and viewing history information for each user included in the user attribute information. A scheduled time alarm function may be provided, and a scheduled recording function, a scheduled chargeable downloading function, a scheduled viewing function, and the like may be performed at the scheduled time.

Referring to FIG. 4B, a user 420 searches for content of interest of a service provider 412 on the web. A broadcasting content providing apparatus 424 of a TV 426 receives a TV broadcasting content. A content service management apparatus 416 may receive content attribute information about the content of interest from the service provider 412. The content service management apparatus 416 may provide a second device 422 with content viewing history information 418 included in user attribute information about the user 420.

The second device 422 compares the content viewing history information 418 with scheduled recording or viewing time information 430. When a scheduled time is reached, the second device 422 may request a broadcasting service providing apparatus 424 for scheduled content provision and thus may receive a broadcasting content 435. Alternatively, if the second device 422 provides the scheduled recording or viewing time information 430 to the broadcasting content providing apparatus 424, the broadcasting content providing apparatus 424 may transmit the broadcasting content 435 scheduled at the scheduled time to the second device 422. The content service management apparatus 416 or the broadcasting content providing apparatus 424 may perform a viewing alarm function immediately when the scheduled time is reached.

The content attribute information may include CID log database, and the user attribute information may include content viewing history information for each user. In addition, information such as an EPG, a content provider list, and the like may be received from the service provider 412.

Referring to FIG. 4C, the broadcasting content service management apparatus 462 corresponds to the content service managing apparatus 100.

In step 440, a user searches for content of interest 442 and 444 of the service provider 412 by using a TV that is a first device. In operation 450, the broadcasting content service management apparatus 462 displays viewing history information 455 including a content-of-interest broadcasting schedule or new registration information on the TV 426. The viewing history information 455 may be updated by a service provider 412 and according to an EPG 452. Content may be recommended based on the viewing history information 455.

In step 460, a content use request receiving unit of the broadcasting content service providing apparatus 462 receives a time at which scheduled recording, scheduled chargeable downloading, or scheduled viewing is desired, through a schedule setting window 465.

In step 470, a content provision controlling unit of the broadcasting content service providing apparatus 462 may transmit a scheduled content to a second device 475, which is a reproduction terminal, at a scheduled time, and the second device 475 may reproduce the scheduled content.

Accordingly, duplicate purchases of the same chargeable content may be prevented by using content information integrated based on content viewing history information. When content is scheduled to be recorded, a good quality of content may be secured.

FIGS. 5A and 5B are a flowchart and a schematic view, respectively, of a content service providing and managing method according to an embodiment of the present invention, and FIG. 5C illustrates a scenario implemented by a content service management apparatus according to an embodiment of the present invention.

In FIGS. 5A, 5B, and 5C, an optimal device for reproducing content is selected.

Referring to FIG. 5A, in step 502, a use request for content is received from a first device from among the devices of a network. In operation 504, at least one of content attribute information, device attribute information, user attribute information, and content use history information is collected and managed.

In step 506, the first device controls at least one second device capable of reproducing the content to be selected from the devices of the network and the selected second device to receive and reproduce the content from the web, based on the content attribute information and the device attribute information.

The device attribute information according to the third embodiment may include information about a device status such as a distance between a device ad and a user, a location of the device, an on/off mode thereof, an operation wait/ready status thereof, current availability thereof, and a wake-up/sleep mode thereof, information about a device function such as a display function, a multimedia recording function, a multimedia editing function, a multimedia encoding function, and a multimedia decoding function, and information about a system performance such as a storage capacity of the device, a codec thereof, and transcoding.

The content attribute information may include information about the location where the content is stored, the type of the content, the video quality/volume thereof, the use authority thereof, and the like. The user attribute information according to the third embodiment may include information about a user account in the DECE.

Accordingly, the content service providing method 500 may establish an optimal content reproducing environment by selecting an optimal reproduction device by corresponding functional characteristics of the devices of the network and content characteristics to each other.

Referring to FIG. 5B, a content service management apparatus 515 may select a device capable of optimally reproducing content 512, namely, an optimal reproduction device, from devices 521, 523, 525, 527, and 529 of a network 520.

The devices 521, 523, 525, 527, and 529 of the network 520 may provide the content service management apparatus 515 with information about device attributes, and the content service management apparatus 515 may select the device 525 as the optimal reproduction device according to device attribute information and content attribute information. In other words, an optimal device capable of reproducing content may be selected from a plurality of devices of a network belonging to a single user.

Referring to FIG. 5C, the broadcasting content service management apparatus 515 corresponds to the content service managing apparatus 515 of FIG. 5B.

In step 530, a first device 535 is recommended educational content 537 from the web community 532. A content use request receiving unit of the broadcasting content service management apparatus 515 may receive a request for use of recommended content from the first device 535.

A content provision controlling unit of the broadcasting content service management apparatus 515 ascertains device attribute information of devices 542, 544, 546, and 548 of a network 545. The device attribute information may include information about a device status such as current availability and a wake-up/sleep mode, information about a device function, and information about a distance between a device and a user.

In step 550, the content provision controlling unit of the broadcasting content service management apparatus 515 provides the first device 535 with a currently-reproducible device list 557 according to the device attribute information. The currently-reproducible device list 577 includes at least one neighboring display device and at least one optimal display device. In operation 550, a user 555 may select a desired second device 529 from the currently-reproducible device list 577. The content provision controlling unit of the broadcasting content service management apparatus 515 transmits content to the selected second device 529.

In step 560, the first device 535 may remotely control the second device 529 to reproduce a recommended educational content.

Thus, in the content service providing apparatus or the content service providing method according to an embodiment of the present invention, a user may be automatically recommended content without needing to search for content of interest from the web. Thus, the time required to search for the content of interest is saved, whereby effective time management may be performed. In addition, content consumption may be performed in an optimal reproducing environment, and a desired content may be reproduced in a desired place without technical restrictions. Thus, conversion of the reproducing environment is convenient.

FIGS. 6A and 6B are a flowchart and a schematic view, respectively, of a content service providing and managing method according to an embodiment of the present invention. FIG. 6C illustrates a scenario implemented by a content service management apparatus according to an embodiment of the present invention.

In FIGS. 6A, 6B, and 6C, content that can be reproduced by a device is selected.

Referring to FIG. 6A, in step 601, a request for reception of a reproducible content is received from a first device from among the devices of a network. In step 602, at least one of content attribute information, device attribute information, user attribute information, and content use history information is collected and managed.

In step 603, at least one of the content attribute information, user attribute information about a user of the first device, and the content use history information is compared with device attribute information about the first device so as to search for a first content having a format reproducible by the first device.

In step 604, it is determined whether the first content is stored in a third device of the network. When it is determined in step 604 that the first content is stored in the third device, the first device downloads the first content of the third device, in step 605.

However, when it is determined in step 604 that the first content is not stored in the third device, it is determined whether the first content is located outside the network, in step 606. When it is determined in step 606 that the first content stored outside the network is recommended, the first device downloads the first content from the outside of the network, in step 607.

When it is determined in step 606 that the first content having the format reproducible by the first device is not stored even outside the network, a second content that is the same as the first content in terms of content but has a format not reproducible by the first device is searched for, in step 608. When the second content exists, the second content is transmitted to a fourth device capable of performing transcoding from among the devices of the network, in step 609. A second content obtained by transcoding the second content to have the format reproducible by the first device is transmitted to the first device.

Referring to FIG. 6B, content that can be reproduced by a first device 627 is recommended.

A content service managing apparatus 620 manages a content list 612, content use history information 614, content service schedule information 616, content attribute information 618, and user context information included in the user attribute information about a user 625.

The device attribute information may include information about an operation wait/ready state of a device, information about a function of the device, and information about a system performance such as the storage capacity, codec, transcoding, and the like of the device. The content attribute information 618 may include information about the type, video quality/volume, use authority, and the like of content. The user attribute information according to the fourth embodiment may include user context information about the location and situation of a user.

The content service management apparatus 620 may recommend content having a format reproducible by a first device 627 of the user 625 by comparing device attribute information of the first device 627, the content attribute information 618, user location information, and the content use history information 614 with one another. In other words, an optimal content for a predetermined device from among a plurality of devices of a network belonging to a single user may be determined.

Referring to FIG. 6C, the content service management apparatus 620 corresponds to the content service managing apparatus 100.

In step 630, the user 625 reproduces content through the first device 627. Not only content directly reproducible by the first device 627 but also content having a codec or file type different from the content directly reproducible by the first device 627 may be reproduced.

In step 640, when the first content having a format reproducible by the first device 627 is stored in a third device of the network, a content provision controlling unit of the content service management apparatus 620 controls the first device 627 to download the first content of the third device. The user 625 may request for downloading of the first content through a download window 642 of the first device 627.

In step 650, content outside the network that can be reproduced by the first device 627 may be recommended. For example, the first device 627 may receive a reproduction command of the user 625 by outputting a recommendation notice window 656 for content 654. When the reproduction command is received, the content provision control unit of the content service management apparatus 620 may control the first device 627 to receive the content 654 from a service provider 652 outside the network.

When only a second content not reproducible by the first device 627 is found, the content provision controlling unit of the content service management apparatus 620 may control the first device 627 to transmit the second content to a fourth device capable of performing transcoding from among the devices of the network, the fourth device to perform transcoding on the second content, and a transcoded content to be transmitted to the first device 627, in step 660.

Thus, in the content service providing apparatus or the content service providing method according to an embodiment of the present invention, content may be efficiently checked and reproduced within a physical limit such as the storage location or the like of the content or within a technical limit such as the reproducibility or the like of the format of the content.

FIGS. 7A and 7B are a flowchart and a schematic view, respectively, of a content service providing and managing method according to an embodiment of the present invention. FIG. 7C illustrates a scenario implemented by a content service management apparatus according to an embodiment of the present invention.

FIGS. 7A, 7B, and 7C relate to a scenario in which a plurality of users and a plurality of devices use content simultaneously.

Referring to FIG. 7A, in step 701, a purchase request for a chargeable content is received from a first device of a first user from among the devices of a network. The network includes network groups of devices for each of a plurality of users that include the first user and a second user.

In step 702, at least one of content attribute information, device attribute information, user attribute information, and content use history information is collected and managed. The user attribute information may include information about a user account in a DECE system.

In step 703, a second device of the second user which is to share a chargeable content with the first device is determined from the devices of the network by comparing at least one of user attribute information for each user and device attribute information for each device with content attribute information about the first content. The sharing of the chargeable content is not performed until pieces of information, such as the use authorities of a device, content, and a user, are identical with one another.

A content obtaining method may depend on the location of the second user.

In step 704, it is determined whether the location of the second device is close to the first device. The determination may be made based on user location information included in the user attribute information of the second user, and pieces of device location information included in pieces of device attribute information of the first device and the second device. When it is determined in step 704 that the second device is close to the first device, the second device may extract a chargeable content from the first device through local distance communication, in step 705.

However, when it is determined in step 704 that the second device is not close to the first device, the first device may be controlled to directly transmit a chargeable content to the second device remotely located from the first device or transmit link information about the chargeable content to the second device, in step 706. In step 707, the second device selects a chargeable content desired to be shared from a possessed content list of the first device and reproduce the chargeable content together with the first device.

Referring to FIG. 7B, a first user 735 of a first network 730 to which devices 732, 734, 736, and 738 belong may purchase and receive a chargeable content 720 from a service provider 712 or receive a chargeable content 720 stored in a recorder 714. A content service management apparatus may receive a chargeable content 720 desired to be purchased by the first user 735, after determining whether the chargeable content 720 was previously purchased and stored by the devices 732, 734, 736, and 738 of the first network 730, based on various related information 716 such as the content attribute information, the device attribute information, the user attribute information, and the like and content purchasing history information 718 about already-purchased content.

The content service management apparatus may control transmission and reception of a chargeable content so that a second user 745 of a second network 740 to which devices 742, 744, 746, and 748 belong shares a chargeable content of the first user 735. The content service management apparatus may determine whether the second user 745 has a use authority of a level that allows for content sharing with the first user 735.

The content service management apparatus may transmit a chargeable content 722 purchased by the first user 735 to the devices 742, 744, 746, and 748 of the second network 740 and share the chargeable content 722 with the second user of the second network 740, when it is determined based on the content purchasing history information 718 that content 720 desired to be currently received is not the same as content already stored in the devices 742, 744, 746, and 748 of the second network 740 and that the second user 745 is allowed to share a chargeable content with the first user 735.

The device attribute information may include network ID information, information about an operation wait/ready state of a device, information about a function of the device, and information about a system performance such as the storage capacity, codec, transcoding, and the like of the device. The content attribute information may include information about the location of the content, the type thereof, the video quality/volume thereof, the use authority thereof, reproduction or non-reproduction thereof, and the like. The user attribute information may include information about a user account.

The characteristics of content stored in devices belonging to a network are compared with one another to achieve content sharing between the devices of the network. Accordingly, a plurality of users do not repeatedly purchase or store the same content, but may share content stored in a predetermined device together so as to use the content simultaneously.

Referring to FIG. 7C, the broadcasting content service management apparatus 758 corresponds to the content service managing apparatus 100.

In step 750, a first user purchases and watches a chargeable content 754 of a service provider 752 by using a TV 756 that is a first device. The broadcasting content service management apparatus 758 may receive related information 759 to determine whether the first user has ever purchased the chargeable content 754.

A content use request receiving unit of the broadcasting content service management apparatus 758 may receive a request made by another user, such as a younger sibling user 762 to share the chargeable content 754 of the first device. The younger sibling user 762 may make a sharing request to reproduce the chargeable content 754 of the first device on a PC, by using a sharing control window 766 of a mobile phone 764.

In step 760, the younger sibling user 762, who is located near the first user, such as, exists in a room different from a room where the first user is located in the same house, may extract and watch the chargeable content 754 being reproduced on the TV 756 of the first user so as to share the chargeable content 754. A content provision controlling unit of the broadcasting content service management apparatus 758 may control the chargeable content 754 to be transmitted to the PC of the younger sibling user 762.

The content use request receiving unit of the broadcasting content service management apparatus 758 may receive a request made by a user, such as a first friend user 772 to share the chargeable content 754 of the first user. In operation 770, the chargeable content 754 being currently reproduced on the TV 756 of the first user may be transmitted to the first friend user 772 of the first user, or link information about the chargeable content 754 may be transmitted to the first friend user 772. The first friend user 772 may receive and share the chargeable content 754 of the first user through a content receiving check window 776 of a notebook 774. Not only the link information about the chargeable content 754 but also function information about display of the chargeable content 754 may be transmitted to the first friend user 772. The content provision controlling unit of the broadcasting content service management apparatus 758 may control the chargeable content 754 to be transmitted to the notebook 774 of the first friend user 772.

The content use request receiving unit of the broadcasting content service management apparatus 758 may receive a request made by another user, such as a second friend user 782 to share the chargeable content 754 of the first user. In operation 780, the second friend user 782 may obtain a content list of the first user to select the chargeable content 754 from the content list to watch the chargeable content 754 together with the first user. The first friend user 782 may obtain the content list of the first user that is in an online state to select a desired content from the content list and watch the selected content in real time, through a share control window 786 of a TV 784. The content provision controlling unit of the broadcasting content service management apparatus 758 may control the chargeable content 754 to be transmitted to the TV 784 of the second friend user 782.

Accordingly, users capable of sharing a content use authority between themselves may enjoy or share the same content simultaneously, so that a plurality of users and a plurality of devices may experience a single content.

FIGS. 8A and 8B are a flowchart and a schematic view, respectively, of a content service providing and managing method according to an embodiment of the present invention and FIG. 8C illustrates a scenario implemented by a content service management apparatus according to an embodiment of the present invention.

FIGS. 8A, 8B, and 8C relates to a case where a parent manages content for child education according to a content viewing history for the content for child education.

Referring to FIG. 8A, in step 802, when a distance between a device that reproduces a current content and a user is greater than a predetermined critical value, a conditional content transmission request for transmitting content to the other devices of a network is received from the user.

In step 804, at least one of content attribute information, device attribute information, user attribute information, and content use history information is collected and managed.

In step 806, it is determined whether a condition of the conditional content transmission request is satisfied. That is, the distance between the device that reproduces the current content and the user is repeatedly compared with the predetermined critical value.

If it is determined in step 806 that the distance between the device that reproduces the current content and the user is greater than the predetermined critical value because the user becomes far away from the device that reproduces the current content, the content is controlled to be transmitted to all of the other devices of the network, in step 808. The content may be transmitted in real time to the other devices through streaming of a broadcasting content.

A service provider of the content may provide an education-consulting service prepared by an education specialist. The education specialist may manage content use history information about content, which includes information about content watched by children and information about the current situation and outcome of the education of children using the content. The education specialist may provide feedback information about the current situation and outcome of the education to the user. The user may be recommended a related content selected based on the content watched by children and the current situation or outcome of the education.

Referring to FIG. 8B, which is a schematic view of a content service providing and managing method 810 according to the sixth embodiment, a child user 812 views children's educational content 820, and content viewing history information 814 of the child user 812 is provided to an education specialist 816 of a service provider 818. The education specialist 816 may analyze an education progress, an outcome, and the like and the preference and aptitude of the child user 812 based on the viewing history information 814 of the child user 812 and thus may recommend a child educational content suitable for the child user 812.

A children-educating content service management apparatus according to the sixth embodiment may control a network 830 to which devices 831, 832, 833, 834, 835, and 836 of a parent user 825 belong to receive the children educational content 820. The children-educating content service management apparatus according to the sixth embodiment senses a distance between a device currently reproducing the children educational content 820 and the child user 812 by using a distance sensor or the like. When it is sensed that the child user 812 is a predetermined distance or greater away from the currently reproducing device, the children-educating content service management apparatus, which is for children education, transmits the children educational content 820 to all of the devices 831, 832, 833, 834, 835, and 836 of the network 830.

In particular, when it is sensed that the child user 832 is moving away from the currently reproducing device by a predetermined distance or greater, it may be predicted that the child user 812 is moving together with the parent user 825, and thus the content service management apparatus for children education may transmit the children educational content 820 to mobile devices of the network 830 through real-time streaming.

Referring to FIG. 8C, the children-educating content service management apparatus corresponds to the content service managing apparatus 100. In step 840, broadcasting content history information 846 for broadcasting content watched by a child user 842 through a TV 844 is transmitted to a service provider 848 on the web and thus integrally managed. The broadcasting content history information 846 includes a day and time ("2009/08/30 14:30"), a broadcasting program name ("SESAME STREET #12"), etc.

An education specialist of the service provider 848 manages an education progress and an outcome of the child user 842 based on viewing history information about a children-education content and recommended content suitable for the child user 842 based on the education progress or the outcome of the child user 842. In operation 850, the children-educating content service management apparatus provides the content recommended by the education specialist to a parent user 862.

The education specialist of the service provider 848 prepares for a children-educating content analysis material 851, based on the broadcasting content history information 846. The children-educating content analysis material 851 includes information 852 about the child user 842, a list 856 of already-purchased content, and a list 858 of content recommended by the education specialist.

In step 860, a content provision controlling unit of the children-educating content service management apparatus performs a 'Refresh' operation based on a distance between the TV 844 and the child user 842 and controls content being currently watched by the child user 842 to be stored in all of a plurality of devices 871, 872, 873, 874, and 875 of a network 870.

When sensing the child user 842 to be a predetermined distance or greater away from the currently reproducing device by using a distance sensor or the like, the content provision controlling unit of the children-educating content service management apparatus may stream a currently watched content to the network 870 of the parent user 862. Content that is to be refreshed may be stored in all of the devices 871, 872, 873, 874, and 875 of the parent user 862 so that the child user 842 can watch the content regardless of location.

Accordingly, the parent user 862 may purchase a conditional children-educating content providing package, which is provided according to the distance between the child user 842 and the currently reproducing device, from the service provider 848. In this case, a request made by the parent user 862 to purchase the children-educating content providing package may be input to a content use request receiving unit of the children-educating content service management apparatus.

When a child needs to move to another place while watching his or her favorite content, the children-educating content service management apparatus may allow the child to keep watching the favorite content and thus call the child's attention. In addition, since the education course of a child is integrally managed by an education specialist and the child can be recommended an educational content in consideration of the educational outcome and preference of the child, interests of the child in the educational content may be maintained.

The content service management apparatuses described above with reference to FIGS. 3A through 8C may be directly involved in transmission and reception of content by directly transmitting the content in order to control the content providing process for the content. In addition, the content service management apparatus may be only involved in determination of content or determination of devices that are to perform content transmission and reception, and may not be involved in the content transmission and reception between the devices. Moreover, the content service management apparatus may control the content transmission and reception between the devices by instructing the devices to perform the content transmission and reception.

In the content service providing and managing methods and apparatuses performing the methods according to the above-described embodiments, since content use of a user can be integrally managed based on content use history such as content purchase, content viewing, content use, and the like, duplicate purchase or duplicate storage of content is prevented, and an optimal device to reproduce the content, an optimal content to be reproduced, and the like may be recommended. Thus, the user may more effectively and efficiently use content.

The embodiments of the present invention can be written as computer programs and can be implemented in general-use digital computers that execute the programs using a computer readable recording medium. Examples of a computer readable recording medium include magnetic storage media (e.g., ROM, floppy disks, hard disks, etc.), optical recording media (e.g., CD-ROMs, or DVDs), etc.

While the present invention has been shown and described with reference to certain embodiments thereof, it will be understood by those of ordinary skill in the art that various changes in form and details may be made therein without departing from the spirit and scope of the present invention as defined by the appended claims. The embodiments should be considered in descriptive sense only and not for purposes of limitation. Therefore, the scope of the present invention is defined not by the detailed description of the invention but by the appended claims.

What is claimed is:

1. A content service managing method comprising:
receiving a use request for content from a first device from among a plurality of devices of a network;
collecting and managing user attribute information about at least one user of the devices, and at least one of content attribute information about the content, device attribute information about the plurality of devices, and content use history information; and
controlling the content to be provided to at least one second device capable of reproducing the content and selected from among the plurality of devices of the network, in response to the use request from the first device;
wherein the user attribute information comprises information about a use authority of the at least one user for at least one of the devices and the content.

2. The content service managing method of claim 1, wherein the controlling of the content to be provided comprises determining whether the at least one second device uses the content duplicately, based on at least one of the content use history information and the content attribute information.

3. The content service managing method of claim 1, wherein the content attribute information includes at least one of a Content IDentifier (CID) of the content, log data of the CID, a location, video quality, resolution, audio quality, volume, type, genre of the content, a parent control on the content, the use authority of the content, reproduction history of the content, information about a user, and information about a used device.

4. The content service managing method of claim 1, wherein the device attribute information includes at least one of a location of the device, a network ID of the device, a user, a useable codec type, a storage capacity of the device, whether the device can perform transcoding, a display resolution, a distance between the device and the user, an on/off mode of the device, an operation wait/ready status of the device, current availability of the device, a wake-up/sleep mode of the device, a display function of the device, a multimedia recording function of the device, a multimedia editing function of the device, a multimedia encoding function of the device, and a multimedia decoding function of the device.

5. The content service managing method of claim 1, wherein the user attribute information further comprises at least one of a network ID of the user, use history of the content, a user domain, a user account, and a user location.

6. The content service managing method of claim 1, wherein the content use history information includes at least one of pieces of information about a device using the content, a user using the content, a storage location of the content, a time at which the content is used, use completion history and use interruption history of the content, use reservation of the content, interest product item registration of the content, available time of the content, not-watched content broadcasting information, and information about update of a new content.

7. The content service managing method of claim 1, further comprising receiving at least one of an electronic program guide and a content provider list from a service provider.

8. The content service managing method of claim 1, wherein a content using method regarding the content use history information comprises at least one of transmission of the content, reproduction of the content, downloading of the content, sharing of the content, storage of the content, and purchase of a chargeable content.

9. The content service managing method of claim 1, wherein receiving the use request for the content comprises receiving a request from the first device from among the plurality of devices, wherein the request allows at least one device other than the first device from among the plurality of devices of the network to use the content.

10. The content service managing method of claim 1, wherein receiving the use request for the content comprises receiving a request from the first device from among the plurality of devices, wherein the request asks for use of content stored in at least one device other than the first device from among the plurality of devices of the network.

11. The content service managing method of claim 1, wherein receiving the use request for the content comprises:
   searching, in the first device, for content from outside of the network; and
   receiving a use request for the searched content from the first device.

12. The content service managing method of claim 1, wherein receiving the use request for the content comprises:
   recommending content from outside of the network to the first device; and
   receiving a use request for the recommended content from the first device.

13. The content service managing method of claim 1, further comprising determining a method of obtaining the content, based on at least one of content attribute information, device attribute information, user attribute information, and content use history information,
   wherein the method of obtaining the content comprises a method of obtaining the content through at least one of an operation for the at least one second device to reserve the use of the content, an operation for the at least one second device to register the content in an interest product list, an operation for the at least one second device to access a network address and downloading the content from the network address, an operation for the at least one second device to purchase the content from a service provider, an operation for the at least one second device to receive a recommendation for the content, an operation for the at least one second device to receive the content from the other devices of the network, an operation for the at least one second device to transmitting the content to a device capable of performing transcoding from among the plurality of devices of the network, an operation for the at least one second device to using the content together with the other devices in real time, and an operation of simultaneously receiving the content together with all of the devices of the network.

14. The content service managing method of claim 1, wherein controlling the content to be provided to the at least one second device comprises controlling the first device or the at least one second device to search for the content and acquire the content from a location where the searched content is stored.

15. The content service managing method of claim 1, wherein controlling the content to be provided to the at least one second device comprises mediating separate devices implementing the content service managing method so that the content is searched for and the content is transmitted to the at least one second device from a location where the searched content is stored.

16. The content service managing method of claim 1, wherein receiving the use request for the content comprises:
   analyzing, in a service provider, a content use pattern of the first device according to content use history of the first device;
   providing, by the service provider, a recommended content list including at least one content recommended to the first device, based on the content use pattern; and
   receiving a use request for content selected from the recommended content list from the first device.

17. The content service managing method of claim 1, wherein the content service managing method is performed by one of the plurality of devices of the network or by a device of a network on an upper layer of the network.

18. The content service managing method of claim 1, wherein receiving the use request for the content from the first device comprises receiving a content purchase request from the first device, and
   wherein controlling the content to be provided comprises:
   controlling a third device that has already purchased and stores the content to be searched for from among the other devices of the network, based on the content use history information about the content requested to be purchased; and
   controlling the content stored in the third device to be transmitted to the first device.

19. The content service managing method of claim 1, wherein receiving the use request for the content from the first device comprises:
   receiving a use request for content of interest found through the web from the user; and
   setting reserved use for the content of interest, and
   wherein controlling the content to be provided comprises:
   controlling the at least one second device capable of reproducing the content of interest to be selected from the devices of the network based on the content use history information; and
   controlling the at least one second device to receive the content of interest at a scheduled time, based on scheduled time information included in scheduled use setting information about the content of interest and content available time information included in the content use history information.

20. The content service managing method of claim 1, wherein controlling the content to be provided comprises:
   controlling the at least one second device capable of reproducing the content to be selected from the devices of the network through the first device; and
   controlling the at least one selected second device to receive the content from the web, based on the content attribute information and the device attribute information, under the control of the first device.

21. The content service managing method of claim 1, wherein receiving the use request for the content from the first device comprises receiving a reception request for content that can be reproduced from the first device from among the devices of the network, and
   wherein controlling the content to be provided comprises:
   comparing at least one of the content attribute information, user attribute information about a user of the first device, and the content use history information with device attribute information about the first device; and
   searching for a first content having a format reproducible by the first device.

22. The content service managing method of claim 1, wherein
   receiving the use request for the content from the first device comprises receiving a purchase request for a chargeable content from the first device of a first user from among the devices of the network,
   wherein controlling the content to be provided to the at least one second device comprises determining the at least one second device of a second user which is to share the chargeable content with the first device from the devices of the network by comparing at least one of user attribute information for each user and device attribute information for each device with content attribute information about the first content, and
   wherein the network includes network groups of devices for each of a plurality of users that include the first user and the second user.

23. The content service managing method of claim 1, wherein receiving the use request for the content from the first device comprises receiving a content transmission request having a condition that the content is transmitted when a distance between the first device, currently reproducing the content from among the devices of the network, and a user is greater than a predetermined critical value, and
    wherein controlling the content to be provided to the at least one second device comprises:
    controlling devices other than the first device from among the devices of the network to receive the content when the content transmission condition is satisfied; and
    controlling all of the other devices to receive the content when the content transmission condition is satisfied.

24. A content service management apparatus of a network that performs data communication, the content service management apparatus comprising:
    a content use request receiving unit that receives a use request for content from a first device from among a plurality of devices of the network;
    a related information managing unit that collects and manages user attribute information about at least one user of the devices, and at least one of content attribute information about the content, device attribute information about the plurality of devices, and content use history information; and
    a content provision controlling unit that controls the content to be provided to at least one second device capable of reproducing the content and selected from among the devices of the network, in response to the use request from the first device;
    wherein the user attribute information comprises information about a use authority of the at least one user for at least one of the devices and the content.

25. The content service management apparatus of claim 24, wherein the content service management apparatus is included in the devices of the network or in a network on an upper layer of the network.

26. A content using apparatus of a network device that performs data communication, the content using apparatus comprising:
    a content use requesting unit that requests at least one other device of a network to use content under the control of a content service management apparatus that manages a content service of the devices of the network; and
    a first device information managing unit that manages user attribute information about a user of the content using apparatus, and at least one of device attribute information about the content using apparatus, content attribute information about content used by the content using apparatus, and content use history information, and provides the selected information to the content service management apparatus,
    wherein:
        it is determined whether the content is to be provided to the at least one other device based on the content attribute information, the device attribute information, the user attribute information, and the content use history information,
        the content is provided from the devices of the network or from outside of the network, and
        the at least one other device is capable of reproducing the content, and
        the user attribute information comprises information about a use authority of the user for at least one of the devices and the content.

27. A content using apparatus of a network devices that performs data communication, the content using apparatus comprising:
    a device information managing unit that manages user attribute information about a user of the content using apparatus, and at least one of device attribute information about the content using apparatus, content attribute information about content used by the content using apparatus, and content use history information and provides the managed information to a content service management apparatus which manages a content service of the devices of the network; and
    a content receiving unit that receives the content from the devices of the network or from outside of the network under the control of the content service management apparatus,
    wherein, at a content using request of another device of the network, it is determined whether the content is to be provided to the content using apparatus, based on at least one of the content attribute information, the device attribute information, the user attribute information, and the content use history information,
    wherein the content using apparatus is capable of reproducing the content, and is selected from the network devices, and
    wherein the user attribute information comprises information about a use authority of the user for at least one of the devices and the content.

28. The content using apparatus of claim 27, wherein the content receiving unit receives the content from the devices of the network or from outside of the network via the content service management apparatus.

29. The content using apparatus of claim 27, wherein in the content receiving unit, the content using apparatus is searched for by the devices of the network and outside the network, and the content is transmitted from the devices of the network and outside the network to the content using apparatus, based on at least one of the content attribute information, the device attribute information, the user attribute information, and the content use history information provided by the content service management apparatus.

30. A content using apparatus of a network device that performs data communication, the content using apparatus comprising:
    a device information managing unit that manages user attribute information about a user of the content using apparatus, and at least one of device attribute information about the content using apparatus, content attribute information about content stored in the content using apparatus, and content use history information and provides the managed information to a content service management apparatus that manages a service content of the devices of the network; and
    a content transmitting unit that transmits the content to at least one second device of the network under a control of the content service management apparatus,
    wherein, at a content using request of a first device of the network, it is determined whether the content is to be provided to the at least one second device, based on at least one of the content attribute information, the device attribute information, the user attribute information, and the content use history information,
    wherein the at least one second device is capable of reproducing the content and is selected from the network devices, and wherein the user attribute information comprises information about a use authority of the at least one user for at least one of the devices and the content.

31. The content using apparatus of claim 30, wherein the content transmitting unit transmits the content to the at least one second device under a control of the content service management apparatus.

32. The content using apparatus of claim 30, wherein the content transmitting unit transmits the content at a content transmission request of the first device or the at least one second device having searched for a storage location of the content, based on at least one of the content attribute information, the device attribute information, the user attribute information, and the content use history information provided by the content service management apparatus.

33. A computer-readable recording medium having recorded thereon a program for executing the content service providing method, comprising:
   receiving a use request for content from a first device from among a plurality of devices of a network;
   collecting and managing user attribute information about at least one user of the devices, and at least one of content attribute information about the content, device attribute information about the plurality of devices, and content use history information; and
   controlling the content to be provided to at least one second device capable of reproducing the content and selected from among the plurality of devices of the network, in response to the use request from the first device;
   wherein the user attribute information comprises information about a use authority of the at least one user for at least one of the devices and the content.

* * * * *